US012585924B2

(12) United States Patent
Agrawal et al.

(10) Patent No.: US 12,585,924 B2
(45) Date of Patent: Mar. 24, 2026

(54) CAUSAL MULTI-TOUCH ATTRIBUTION

(71) Applicant: ADOBE INC., San Jose, CA (US)

(72) Inventors: Aniket Agrawal, Surat (IN); Nikhil Sheoran, Chandigarh (IN); Gaurav Sinha, Bangalore (IN)

(73) Assignee: ADOBE INC., San Jose, CA (US)

( * ) Notice: Subject to any disclaimer, the term of this patent is extended or adjusted under 35 U.S.C. 154(b) by 968 days.

(21) Appl. No.: 17/452,519

(22) Filed: Oct. 27, 2021

(65) Prior Publication Data

US 2023/0127453 A1      Apr. 27, 2023

(51) Int. Cl.
*G06N 3/049* (2023.01)
*G06N 3/08* (2023.01)
G06Q 30/01 (2023.01)

(52) U.S. Cl.
CPC .............. *G06N 3/049* (2013.01); *G06N 3/08* (2013.01); *G06Q 30/01* (2013.01)

(58) Field of Classification Search
CPC ........ G06N 3/049; G06N 3/18; G06N 3/0464; G06Q 30/01
See application file for complete search history.

(56) References Cited

U.S. PATENT DOCUMENTS

2019/0340010 A1* 11/2019 Lee ........................ G06F 9/4881
2020/0117980 A1*  4/2020 Friio ........................ G06N 3/08

2021/0265016 A1*  8/2021 Vessere ................... G06F 18/23
2021/0377131 A1* 12/2021 Zilberman .............. H04L 41/16
2022/0019888 A1*  1/2022 Aggarwal ......... G06F 18/23213
2022/0160433 A1*  5/2022 Rafii-Tari .............. G06T 7/0012
2022/0207456 A1*  6/2022 Murphy ........... G06Q 10/06393

FOREIGN PATENT DOCUMENTS

CN          111709225 B  *  5/2023  ............. G06F 16/35

OTHER PUBLICATIONS

Adamson, 2020, "5 Ways the Future of B2B Buying Will Rewrite the Rules of Effective Selling", Available at https://emtemp.gcom.cloud/ngw/globalassets/en/sales-service/documents/trends/5-ways-the-future-of-b2b-buying.pdf, 15 pages.

(Continued)

*Primary Examiner* — Grace Park
(74) *Attorney, Agent, or Firm* — F. CHAU & ASSOCIATES, LLC

(57)                    ABSTRACT

An apparatus and method for causal multi-touch attribution are described. One or more aspects of the apparatus and method include a time series component configured to generate an ordered series representing a plurality of precursor events corresponding to a result event, wherein each of the precursor events is associated with an event category from a set of event categories; a temporal convolution network configured to generate a series of predictive values corresponding to the plurality of precursor events by computing a plurality of hidden vector representations for at least one of the precursor events; and an attribution component configured to compute an attribution value for each of the event categories based on the series of predictive values.

7 Claims, 13 Drawing Sheets

(56)          References Cited

OTHER PUBLICATIONS

Shao, et al., 2011, "Data-driven Multi-touch Attribution Models", in Proceedings of the 17th ACM SIGKDD International Conference on Knowledge Discovery and Data Mining, ser. KDD '11 (pp. 258-264), Available at https://dl.acm.org/doi/10.1145/2020408. 2020453, 7 pages.

Abascal, et al., 2015, "The Definitive Guide to Multi-Touch Revenue Attribution", BrightFunnel, Available at https://web.archive. org/web/20160122171057/http://www.brightfunnel.com/resources/ ebooks/BrightFunnel_Definitive_Guide_To_MultiTouch_Attribution. pdf, 60 pages.

Rothman, et al., 2014, "The Definitive Guide to Lead Generation", Marketo, Inc., Available at https://www.marketo.com/definitive-guides/lead-generation, 160 pages.

Con, et al., 2016, "B2B Marketing Attribution 101", Bizible, Inc, Available at https://engage.marketo.com/rs/460-TDH-945/images/ BZ-B2B-Marketing-Attribution-101-ebook.pdf, 48 pages.

Halchak, 2017, "2017 B2B Buyer's Survey Report", In Demand Gen Report, DemandBase, Available at https://www.demandgenreport. com/resources/research/2017-b2b-buyers-survey-report/, 15 pages.

Zhang, et al., 2014, "Multi-touch Attribution in Online Advertising with Survival Theory", in 2014 IEEE International Conference on Data Mining (pp. 687-696), Available at https://ieeexplore.ieee.org/ document/7023386, 10 pages.

Ji, et al., 2017, "Additional Multi-Touch Attribution for Online Advertising", in Proceedings of the Thirty-First AAAI Conference on Artificial Intelligence (AAAI'17), AAAI Press (pp. 1360-1366), Available at https://ojs.aaai.org/index.php/AAAI/article/view/ 10737, 7 pages.

Ren, at al., "Learning Multi-touch Conversion Attribution with Dual-attention Mechanisms for Online Advertising", arXiv preprint arXiv:1808.03737v2 [cs.IR] Aug. 30, 2018, 10 pages.

Zhou, et al., 2019, "Understanding Consumer Journey using Attention based Recurrent Neural Networks", in Proceedings of the 25th ACM SIGKDD International Conference on Knowledge Discovery and Data Mining, ser. KDD 19, Association for Computing Machinery (pp. 3102-3111), Available at https://dl.acm.org/doi/10.1145/ 3292500.3330753, 10 pages.

Bach, et al., 2015, "On Pixel-Wise Explanations for Non-Linear Classifier Decisions by Layer-Wise Relevance Propagation", in Plos One, vol. 10, No. 7 (pp. 1-46), Available at https://journals.plos. org/plosone/article?id=10.1371/journal.pone.0130140, 46 pages.

Samek, et al., "Evaluating the visualization of what a Deep Neural Network has learned", arXiv preprint arXiv:1509.06321v1 [cs.CV] Sep. 21, 2015, 13 pages.

Dalessandro, et al., 2012, "Causally Motivated Attribution for Online Advertising", in Proceedings of the Sixth International Workshop on Data Mining for Online Advertising and Internet Economy, ser. ADKDD '12, Association for Computing Machinery (pp. 1-9), Available at https://doi.org/10.1145/2351356.2351363, 9 pages.

Zhao, et al., "Shapley Value Methods for Attribution Modeling in Online Advertising", arXiv preprint arXiv:1804.05327 [econ.EM] Apr. 15, 2018, 23 pages.

Singal, et al., 2019, "Shapley Meets Uniform: An Axiomatic Framework for Attribution in Online Advertising", in the World Wide Web Conference, ser. WWW '19, Association for Computing Machinery (pp. 1713-1723), Available at https://doi.org/10.1145/3308558. 3313731, 11 pages.

Du, et al., "Causally Driven Incremental Multi Touch Attribution Using a Recurrent Neural Network", arXiv preprint arXiv:1902. 00215v3 [cs.LG] Feb. 5, 2019, 33 pages.

Lea, et al., "Temporal Convolutional Networks: A Unified Approach to Action Segmentation", arXiv preprint arXiv:1608.08242v1 [cs. CV] Aug. 29, 2016, 4 pages.

Lea, et al., "Temporal Convolutional Networks for Action Segmentation and Detection", arXiv preprint arXiv:1611.05267v1 [cs.CV] Nov. 16, 2016, 10 pages.

Bai, et al., "An Empirical Evaluation of Generic Convolutional and Recurrent Networks for Sequence Modeling", arXiv preprint arXiv:1803.01271v2 [cs.LG] Apr. 19, 2018, 14 pages.

Long, et al., "Fully Convolutional Networks for Semantic Segmentation", arXiv preprint arXiv:1411.4038v2 [cs.CV] Mar. 8, 2015, 10 pages.

Van den Oord, et al., "WaveNet: A Generative Model for Raw Audio", arXiv preprint arXiv:1609.03499v2 [cs.SD] Sep. 19, 2016, 15 pages.

Yu, et al., "Multi-Scale Context Aggregation by Dilated Convolutions", arXiv preprint arXiv:1511.07122v3 [cs.CV] Apr. 30, 2016, 13 pages.

23 2021, "Adobe Marketo Engage-CRM Synchronization Architecture", Adobe, Available at http://developers.marketo.com/wp-content/ uploads/2021/05/Marketo-CRM-Synchronization-Architecture_2021_ Whitepaper-V2.pdf, 27 pages.

* cited by examiner

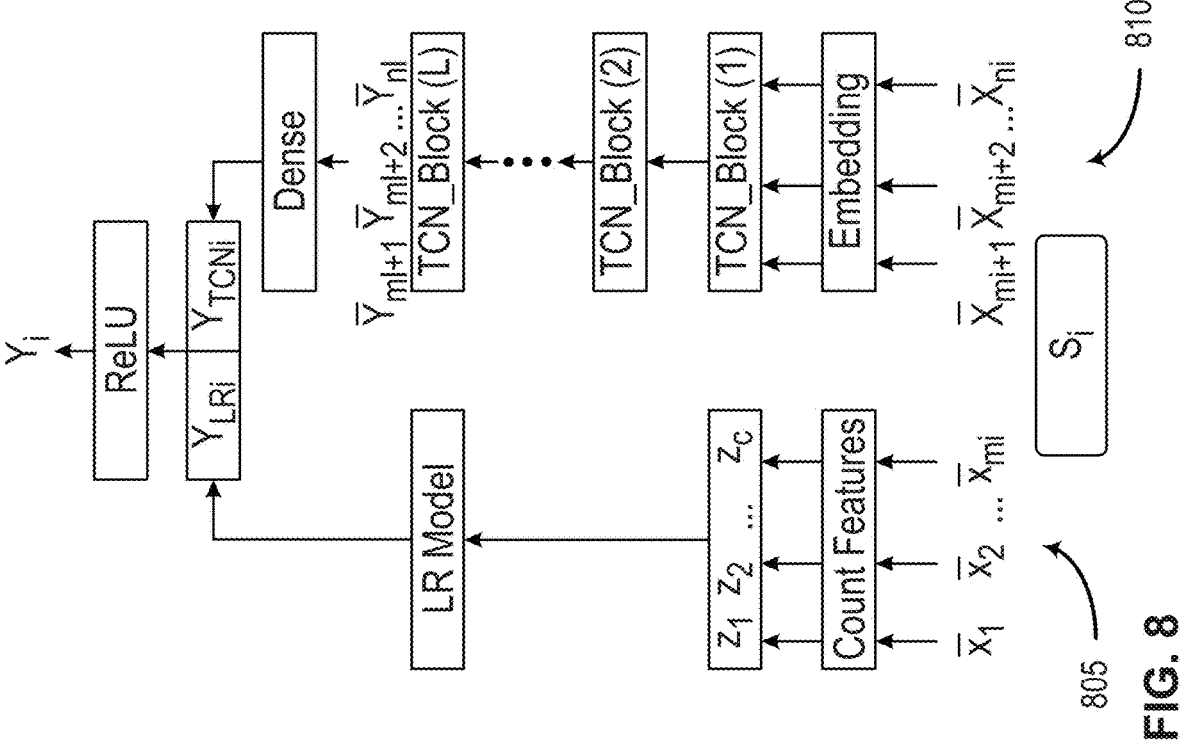
FIG. 8
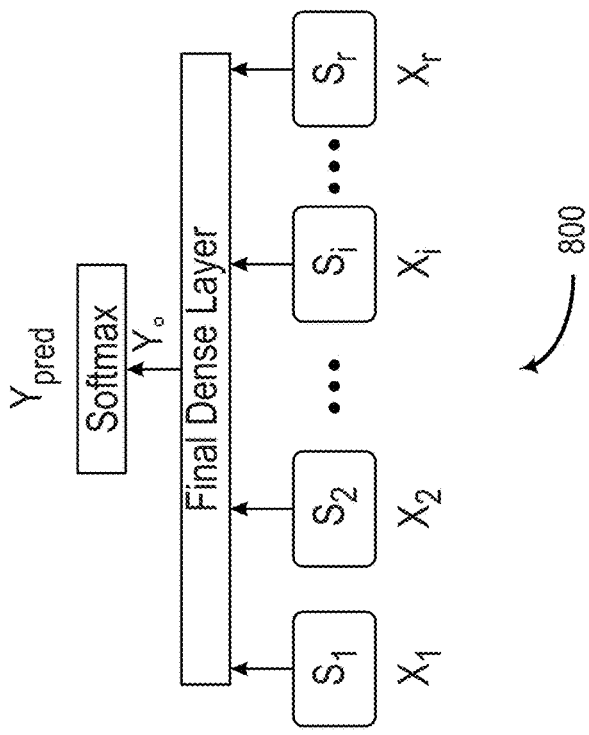

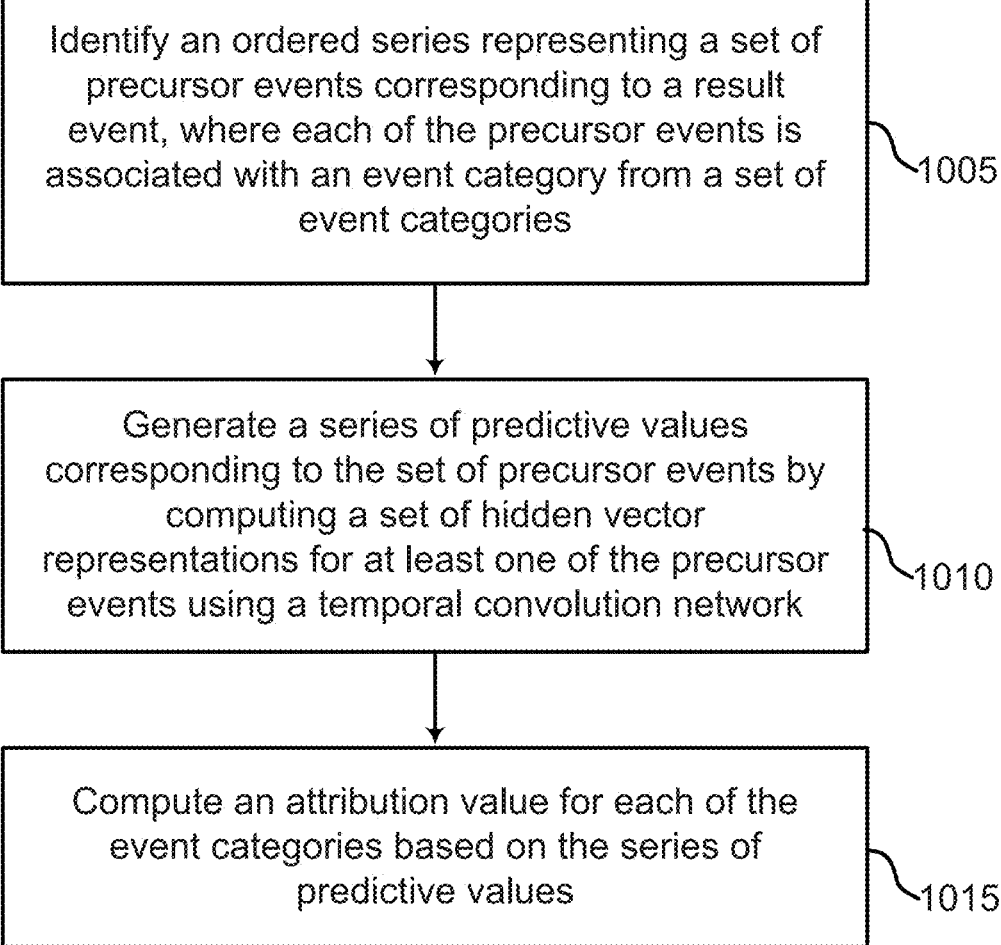

Identify an ordered series representing a set of precursor events corresponding to a result event, where each of the precursor events is associated with an event category from a set of event categories

1005

Generate a series of predictive values corresponding to the set of precursor events by computing a set of hidden vector representations for at least one of the precursor events using a temporal convolution network

1010

Compute an attribution value for each of the event categories based on the series of predictive values

Identify an input size for the temporal convolution network ⟍1105

Determine that a number of the precursor events in the ordered series exceeds the input size ⟍1110

Perform logistic regression on a subset of the precursor events based on the determination, where the attribution value for each of the event categories is based on the logistic regression ⟍1115

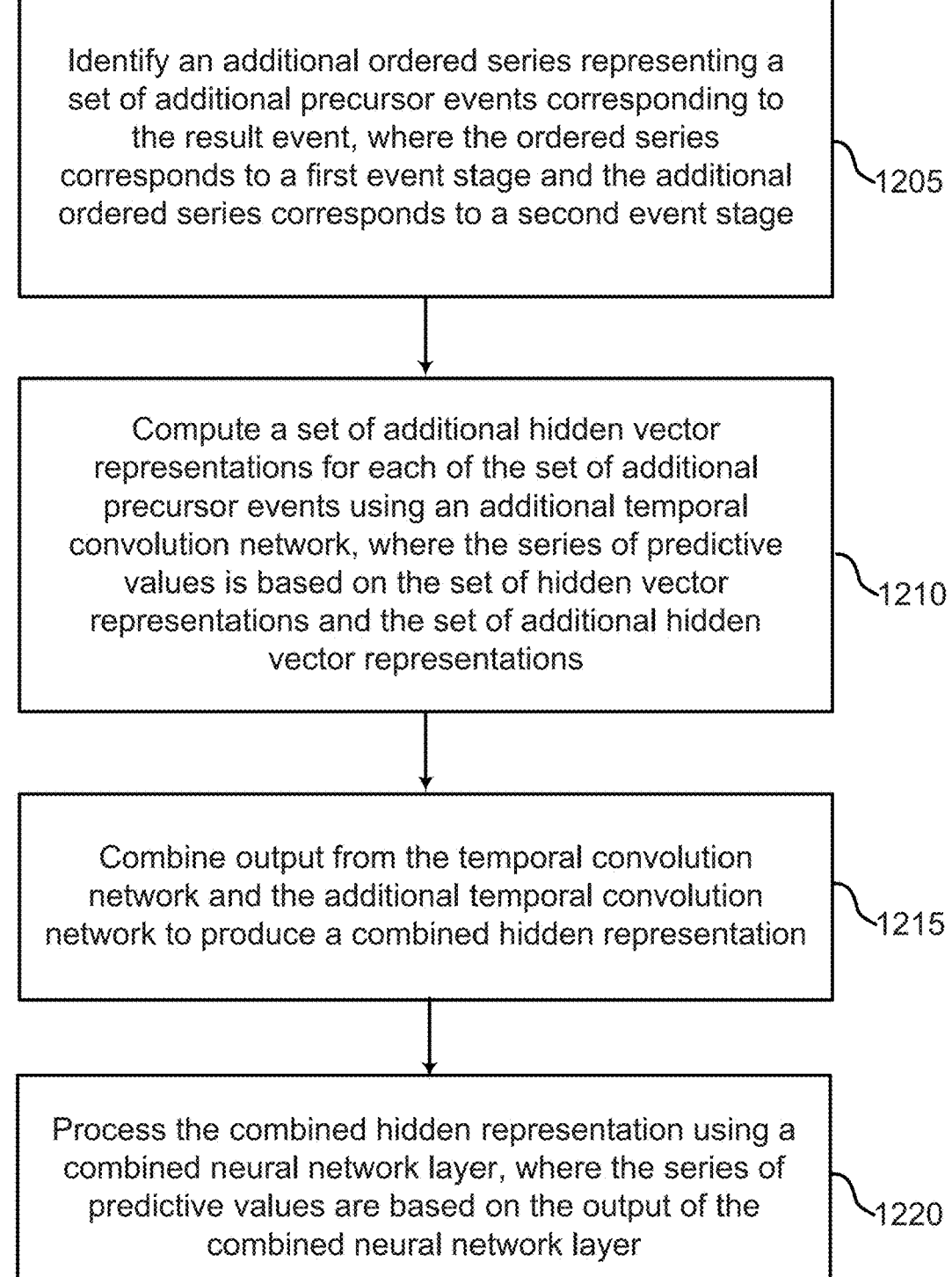

Identify an additional ordered series representing a set of additional precursor events corresponding to the result event, where the ordered series corresponds to a first event stage and the additional ordered series corresponds to a second event stage

1205

Compute a set of additional hidden vector representations for each of the set of additional precursor events using an additional temporal convolution network, where the series of predictive values is based on the set of hidden vector representations and the set of additional hidden vector representations

1210

Combine output from the temporal convolution network and the additional temporal convolution network to produce a combined hidden representation

1215

Process the combined hidden representation using a combined neural network layer, where the series of predictive values are based on the output of the combined neural network layer

CAUSAL MULTI-TOUCH ATTRIBUTION

BACKGROUND

The following relates generally to data analytics, and more specifically to causal attribution.

Data analysis, or analytics, is the process of inspecting, cleaning, transforming, and modeling data. In some cases, data analytics systems may include components for discovering useful information, collecting information, informing conclusions, and supporting decision-making. Data analysis can be used to make decisions in a business, government, science, or personal context. Data analysis includes a number of subfields including data mining and business intelligence. Data mining refers to techniques that focuses on statistical modeling and knowledge discovery for predictive purposes (i.e., as opposed to purely descriptive purposes). Business intelligence refers to data analysis that relies heavily on data aggregation to support business decisions. In a statistical context, data analysis includes descriptive statistics, exploratory data analysis (EDA), and confirmatory data analysis (CDA).

In some cases, data analytics platforms perform causal attribution, which refers to the identification of causal relationship among data. Attribution systems may collect data from many sources, store the data according to a particular schema, determine the relationships between events, and present attribution information to users.

However, conventional attribution systems have difficulty tracking and analyzing data that is accumulated over long time periods. Furthermore, these systems fail to perform accurately when the collected data includes non-linear causal relationships (i.e., the attribution systems may not detect and account for these relationships). As a result, attribution systems may provide inaccurate and unreliable attributions to users, thereby misrepresenting the data. Therefore, there is a need in the art for an improved data analytics platform that is capable of performing causal attribution on long term, and non-linear data.

SUMMARY

The present disclosure describes systems and methods for data-driven causal multi-touch attribution that can account for non-linear and long-term causal dependencies between events in a set of event data. Some embodiments of the disclosure obtain data in form of an ordered series representing a plurality of precursor events corresponding to different event categories. A temporal convolutional network (TCN) generates predictive values corresponding to the precursor events, and an attribution component computes attribution information based on the predictive values. Some embodiments include a logistic regression component configured to perform logistic regression on additional data in parallel with the TCN. Some embodiments include a multistage network that includes multiple TCNs corresponding to different stages of a process.

A method, apparatus, and non-transitory computer readable medium for causal multi-touch attribution are described. One or more aspects of the method, apparatus, and non-transitory computer readable medium include identifying an ordered series representing a plurality of precursor events corresponding to a result event, wherein each of the precursor events is associated with an event category from a set of event categories corresponding to a plurality of event stages; generating a series of predictive values corresponding to the plurality of precursor events by computing a plurality of hidden vector representations for at least one of the precursor events by performing a convolution operation on the ordered series using a temporal convolution network; and computing an attribution value for each of the event categories and stage transition information corresponding to transitions between the plurality of event stages based on the series of predictive values.

A method, apparatus, and non-transitory computer readable medium for causal multi-touch attribution are described. One or more aspects of the method, apparatus, and non-transitory computer readable medium include identifying training data including an ordered series representing a plurality of precursor events corresponding to a result event and ground truth conversion data, wherein each of the precursor events is associated with an event category from a set of event categories; generating a series of predictive values corresponding to the plurality of precursor events by computing a plurality of hidden vector representations for at least one of the precursor events using a temporal convolution network; computing a conversion prediction based on the series of predictive values; computing a loss function that compares the conversion prediction to the ground truth conversion data; and updating parameters of the temporal convolution network based on the loss function.

An apparatus and method for causal multi-touch attribution are described. One or more aspects of the apparatus and method include a time series component configured to generate an ordered series representing a plurality of precursor events corresponding to a result event, wherein each of the precursor events is associated with an event category from a set of event categories; a temporal convolution network configured to generate a series of predictive values corresponding to the plurality of precursor events by computing a plurality of hidden vector representations for at least one of the precursor events; and an attribution component configured to compute an attribution value for each of the event categories based on the series of predictive values.

BRIEF DESCRIPTION OF THE DRAWINGS

FIG. 8 shows an example of an attribution component, a logistic regression component, and a multistage network according to aspects of the present disclosure.

FIG. 10 shows an example of a process for causal multi-touch attribution according to aspects of the present disclosure.

FIG. 12 shows an example of a process for multi-stage temporal convolution according to aspects of the present disclosure.

DETAILED DESCRIPTION

Figure 1:
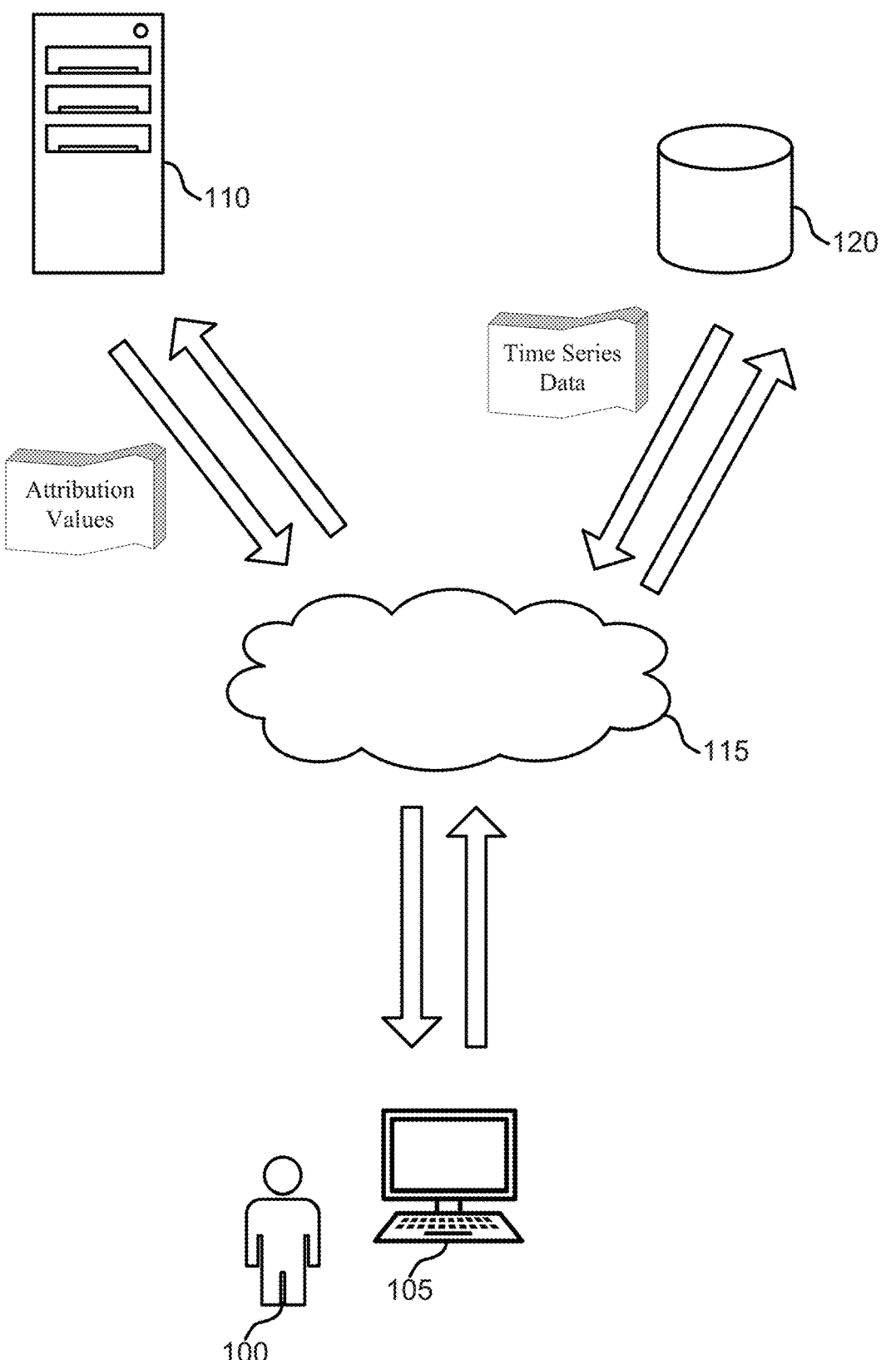
FIG. 1 shows an example of a causal multi-touch attribution system diagram according to aspects of the present disclosure.

The present disclosure describes systems and methods for data-driven causal multi-touch attribution (MTA) that can account for non-linear and long-term causal dependencies between events in a set of event data. Some embodiments of the disclosure obtain data in form of an ordered series representing a plurality of precursor events corresponding to different event categories. A temporal convolutional network (TCN) generates predictive values corresponding to the precursor events, and an attribution component computes attribution information based on the predictive values. Some embodiments include a logistic regression component configured to perform logistic regression on additional data in parallel with the TCN. Some embodiments include a multistage network that includes multiple TCNs corresponding to different stages of a process.

Data analytics systems inspect, clean, transform, and model data. Some data analytics systems perform causal attribution, which refers to the evaluation of causal relationships between events in a dataset. However, existing attribution systems do not perform this attribution process accurately when processing a dataset that includes long-term dependencies between precursor events and result events and non-linear relationships such as multiple event categories. For example, rule-based attribution processes may apply pre-defined attribution rules that do not accurately consider underlying distributions in the data. Additionally, neural network-based processes do not accurately capture sequential dependencies between precursor events and result events in one or more event categories, or weigh the influence of distant precursor events on result events.

In an example context of business and customer interactions, MTA tasks may be attributing credit of conversions to various transitions in the nature of the relationship between a given business and customer, attributing credit of conversions to discrete events in historical relationship between the business and the customer, and attributing credit of each transition to discrete events in the historical relationship. However, conventional data analytics systems do not accurately perform these tasks as they do not properly process long historical relationships that may be complicated by a non-linearity in the relationship caused by the presence of multiple interacting stakeholders in a purchasing entity and/or containing many discrete events that are spaced out by irregular time-gaps.

In an attempt to overcome these difficulties, conventional data analytics systems may employ various rule-based models, which are inadequate because the models do not properly and fully consider the underlying data distributions in input datasets, data-driven methods, which are inadequate because they do not accurately capture sequential dependencies in historical relationships between two or more entities, and various neural network frameworks such as recurrent neural networks, which are inadequate as they either assign relative weights for discrete events independently of the historical relationship, or they do not have access to past events that are needed to capture long-term sequential dependencies.

The present disclosure describes a system and methods for data-driven causal multi-touch attribution that provides more accurate attribution values to a user than conventional multi-touch attribution processes. In some cases, a model to predict a conversion in a historical business and customer relationship is built, and explanation scores (e.g., model parameters, attention weights, etc.) are used for evaluating attributions.

Embodiments of the present disclosure include a data analytics system comprising a time series component, a TCN, and an attribution component that provide accurate attribution of data in a dataset by accounting for underlying data distributions in the dataset and accurately capturing sequential and long-term causal dependencies. In some embodiments, different stages of a process (i.e., different parts of a customer relationship management pipeline) can be represented by different TCN branches. Furthermore, some data is processed by logistic regression to improve computational efficiency.

Embodiments of causal multi-touch attribution systems and methods of the present disclosure include use of a temporal convolution network to accurately identify relationships among distant and non-linearly related events. Furthermore, by incorporating a TCN with multiple levels, where each level is influence only by past events, embodiments of the disclosure minimize attribution of events to future "causes". This provides a deep-learning model that is aware of a correct causal direction in events in the dataset, and is thus able to accurately identify an ordered series of event category-associated precursor events that correspond to a result event. Additionally, the temporal convolution network can represent transitions between stages in the dataset as hidden nodes in the network and adjust a relevance propagation at the hidden nodes according to a dependency on past inputs, thereby generating a series of predictive values that correspond to the precursor events, which minimizes a bias that may be introduced into the calculation of predictive values by the network, allowing for an accurate calculation of attribution values even in a complex and extensive dataset. As a result, systems and methods of the present disclosure use the predictive values to provide attribution values to a user that accurately weigh, for each event category in the set of event categories, the influence of the precursor events on the result event, even when the precursor events and result event are part of a long, complex, and non-linear dataset.

Some embodiments of the present disclosure include a time series component, a TCN, and an attribution component. The time series component may output an ordered series of precursor events associated with event categories. These precursor events correspond to result events. The time series component may provide the ordered series to the TCN. The TCN generates and outputs a series of predictive values based on the ordered series by computing hidden vector representations for at least one of the precursor events included in the ordered series. The output of the TCN is then provided to the attribution component, which computes an attribution value for the event categories based on the series of predictive values, thereby providing a user with attribution values that represent sequential and long-term causal dependencies of the precursor and result events.

The term "temporal convolutional network" refers to a type of convolutional neural network that is useful for sequence modeling tasks.

The terms "precursor event" and "result event" refer to events that have a causal relationship. Specifically, "precursor events" cause "result events."

The term "event category" refers to a label assigned to an event in a time series. For example, if events represent contact between an organization and potential customers, the event categories can represent different communication channels, such as different marketing channels.

The term "predictive values" refers to an intermediate output of a machine learning model (e.g., an output vector) that can be used by another network or algorithm to predict causal relationships among events, or to attribute causality among different channels.

The term "attribution value" refers to a quantification of the causal influence of different event categories in causing certain events.

Embodiments of the present disclosure may be used in the context of data analysis. For example, a system or method based on the present disclosure may be used to help a user accurately determine the extent to which a precursor event contributed to the occurrence of a result event. An example application in the data analysis context is provided with reference to FIGS. 1-5. Details regarding the architecture of an example causal multi-touch attribution apparatus are provided with reference to FIGS. 6-9. Examples of a process for causal multi-touch attribution are provided with reference to FIGS. 10-13.

Causal Multi-Touch Attribution System

FIG. 1 shows an example of a causal multi-touch attribution system diagram according to aspects of the present disclosure. The example shown includes user 100, user device 105, causal multi-touch attribution apparatus 110, cloud 115, and database 120. Causal multi-touch attribution apparatus 110 is an example of, or includes aspects of, the corresponding element described with reference to FIG. 6.

In the example of FIG. 1, one or more users 100 may request attribution values for events represented by data in a given dataset. The user device 105 transmits the request to the causal multi-touch attribution apparatus 110. For each request, causal multi-touch attribution apparatus 110 is configured to compute and provide the attribution values.

One or more users 100 communicates with the causal multi-touch attribution apparatus 110 via one or more user devices 105 and the cloud 115. A user device 105 may be a personal computer, laptop computer, mainframe computer, palmtop computer, personal assistant, mobile device, or any other suitable processing apparatus. In some examples, the user device 105 includes software that can request data from the causal-multi-touch attribution apparatus 110 and/or the cloud 115, such as attribution values according to the methods and processes described in accordance with aspects of the present disclosure, and may receive and display the attribution values to the user 100.

Causal multi-touch attribution apparatus 110 may include a computer implemented network comprising a training unit, an event tracking component, a time series component, a logistic regression component, a temporal convolution network, a multistage network including multiple temporal convolution networks, and/or an attribution component.

Causal multi-touch attribution apparatus 110 may also include a processor unit and a memory unit. Additionally, causal multi-touch attribution apparatus 110 can communicate with the user device 105 and the database 120 via the cloud 115.

In some cases, causal multi-touch attribution apparatus 110 is implemented on a server. A server provides one or more functions to users 100 linked by way of one or more of the various networks. In some cases, the server includes a single microprocessor board, which includes a microprocessor responsible for controlling all aspects of the server. In some cases, a server uses microprocessor and protocols to exchange data with other devices/users 100 on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

In some cases, causal-multi touch attribution apparatus 110 identifies attribution values of precursor events by modelling conversion of customer journeys as functions of stage transitions via a deep learning-based framework. The framework includes a conversion prediction model that represents the transitions at hidden nodes in the network as hidden vector representations. The hidden vector representations can be modelled as functions of an input customer journey by using one or more temporal convolutional networks (TCN) and/or a logistic regression (LR) networks of an LR component. In some cases, layer-wise relevance propagation (LRP) can be used to compute relevance of nodes and inputs in the network, and the relevance scores can then be used as attribution values. In some cases, credit for stage transitions in a dataset is attributed to touch-points that occur prior to the stage transitions using LRP. The attribution values can therefore take causal dependencies between different stages in a dataset into account, and reduce bias in the attribution values by adjusting a relevant propagation at a hidden node in a TCN based on an associated dependence on past inputs. Additionally, causal convolutions in the one or more TCNs can reduce a leakage of future events to past events, thereby making the prediction model aware of the correct causal direction. The deep learning-based framework may accordingly outperform conventional multi-touch attribution techniques in terms of prediction accuracy metrics and attribution value accuracy.

An artificial neural network (ANN) is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.\

During a training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

A convolutional neural network (CNN) is a class of neural network that is commonly used in computer vision or image classification systems. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

A temporal convolutional network (TCN) is a class of convolutional network that is useful in sequence modeling tasks. Specifically, A TCN performs a convolution operation on sequential data. According to embodiments of the present disclosure, a TCN can have the characteristics that information from the future does not leak to the past to preserve causal relationship information, and that the network produces an output of the same length as the input. These characteristics make TCNs suitable for tasks in which a substantially long memory is required. A TCN can produce an output of the same length as the input by using a one-dimensional fully convolutional network architecture in which each hidden layer is the same length as the input layer, and zero padding is added to subsequent layers. A TCN can prevent information leakage by using causal convolution, in which an output at time t is convoluted only with elements from time t and earlier in a previous layer.

In some examples, causal multi-touch attribution apparatus 110 builds TCN-based deep learning models. In some examples, causal multi-touch attribution apparatus 110 uses one or more TCNs, logistic regression TCN (LR-TCN), and/or Stage-LR-TCN to predict conversion of a business-to-business (B2B) customer journeys. LR-TCN adds logistic regression (LR) to TCN using a data-driven approach and trains on an entire customer journey. Stage-LR-TCN uses LR-TCN to model each stage transition in the customer journey and represents stage transitions as hidden nodes in the network.

In some examples, causal multi-touch attribution apparatus 110 adapts a layer-wise relevance propagation (LRP) technique to deep learning-based models for attributing conversion credit to stage transitions and touch-points. In some cases, attribution values of stage transitions are attributed to prior touch-points relative to stage transition representations.

In some examples, causal multi-touch attribution apparatus 110 provides attribution values that account for causal dependencies between touch-points in the journey. For example, a TCN model uses causal convolutions to prevent a leakage of future data into past data. For example, in LR-TCN and Stage-LR-TCN models, the output of one or more TCNs is regressed on corresponding LR inputs, and the regression estimates are used to adjust relevance propagation and correct for time-causality, thus reducing bias in the resulting attribution values.

In some examples, causal multi-touch attribution apparatus 110 may use a region perturbation technique to indicate the reliability of LRP-based attribution values on Stage-LR-TCN. In some examples, causal multi-touch attribution apparatus 110 can provide average attribution values for stage transitions that are generated by aggregating across customer journeys. In some examples, attribution values from Stage-LR-TCN and LR-TCN are more diverse; in other words, the attribution values assign higher significance to stage transitions. As a result, Stage-LR-TCN can used for accurate MTA in B2B journeys.

In some examples, causal multi-touch attribution apparatus 110 employs a TCN-based deep learning model to assign attribution values to precursor events in a customer journey with a high conversion prediction accuracy. For example, attribution-related use cases for a customer may include Adobe® Experience Platform, Adobe® Analytics, Marketo®, etc. One or more embodiments of the disclosure include a method that accounts for temporal causal relationships between touch-points in a customer journey and accurately assigns attribution values to touch-points that drive conversion.

Figure 6:
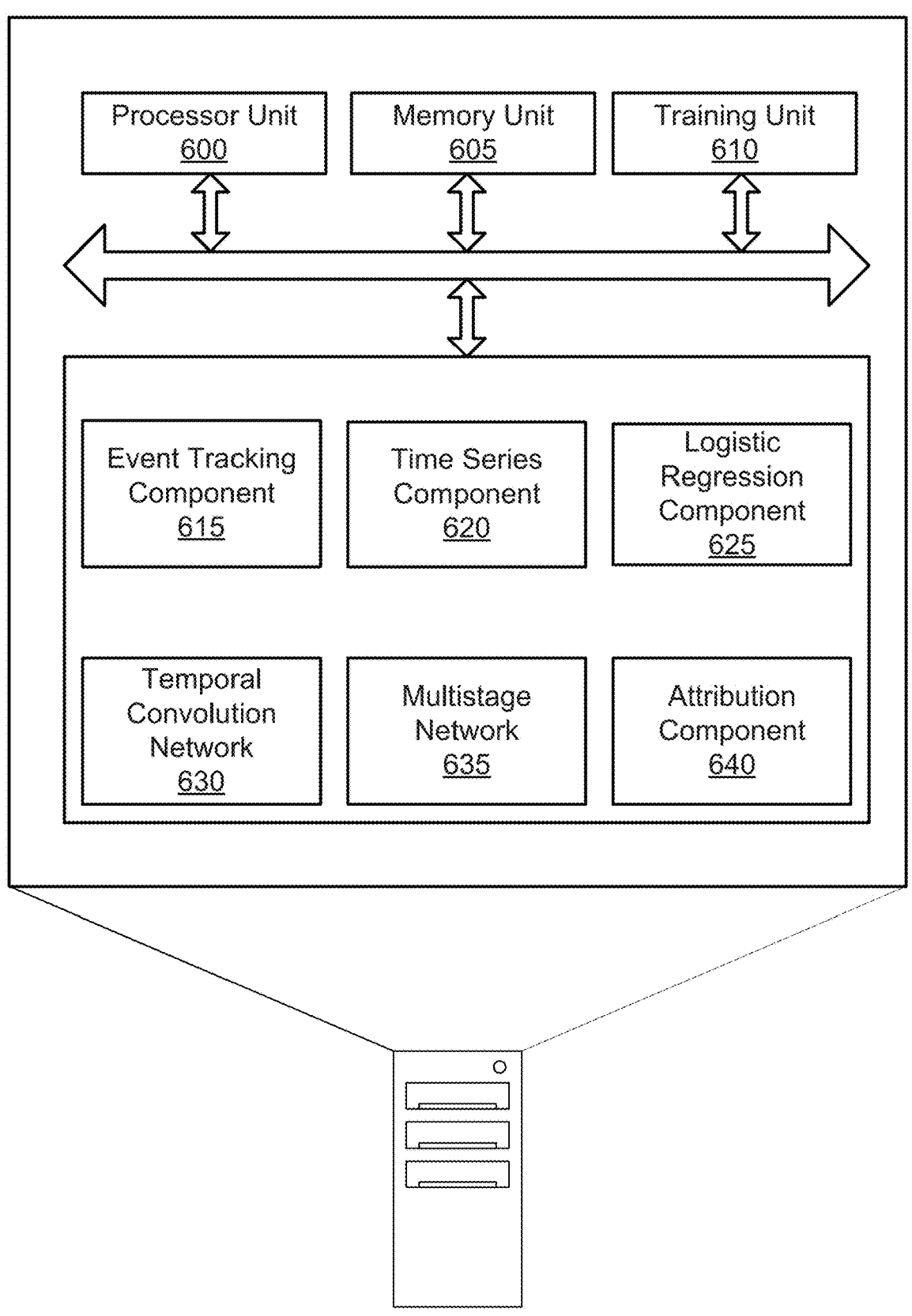
FIG. 6 shows an example of a causal multi-touch attribution system according to aspects of the present disclosure.
Figure 7:
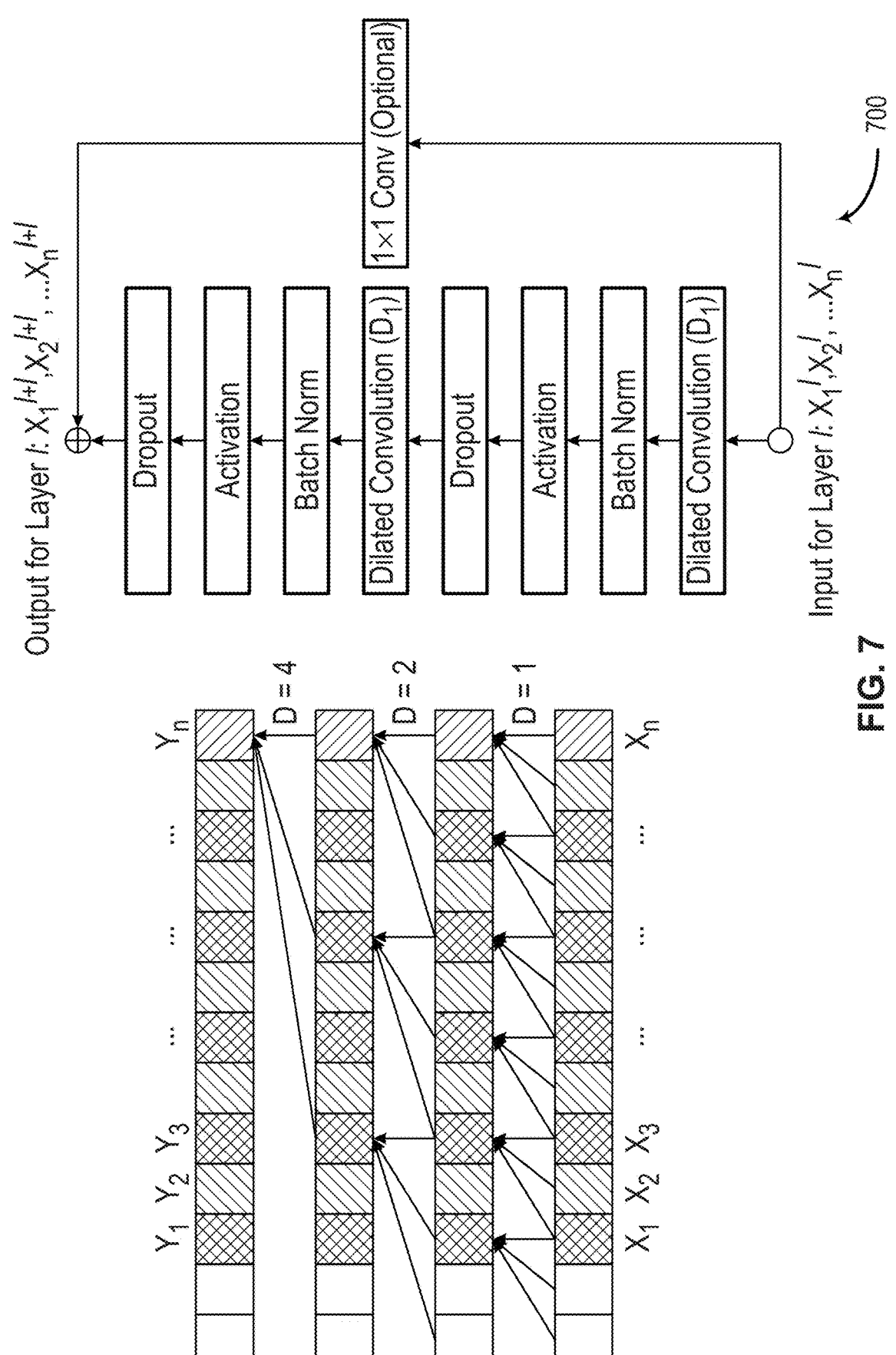
FIG. 7 shows an example of a temporal convolution network according to aspects of the present disclosure.

Further detail regarding the architecture of the causal multi-touch attribution apparatus 110 is provided with reference to FIGS. 6-8. Further detail regarding a process for causal multi-touch attribution is provided with reference to FIG. 9. Further detail regarding a process for causal multi-touch attribution is provided with reference to FIG. 10. Further detail regarding a process for performing logistic regression is provided with reference to FIG. 11. Further detail regarding a process for multi-stage temporal convolution is provided with reference to FIG. 12. Further detail regarding a process for training a temporal convolution network is provided with reference to FIG. 13.

A cloud 115 is a computer network configured to provide on-demand availability of computer system resources, such as data storage and computing power. In some examples, the cloud 115 provides resources without active management by the user 100. The term cloud 115 is sometimes used to describe data centers available to many users 100 over the Internet. Some large cloud 115 networks have functions distributed over multiple locations from central servers. A server is designated an edge server if it has a direct or close connection to a user 100. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 stores data in a specified format known as a schema. A database 120 may be structured as a single database 120, a distributed database 120, multiple distributed databases 120, or an emergency backup database 120. In some cases, a database 120 controller may manage data storage and processing in a database 120. In some cases, a user 100 interacts with database 120 controller. In other cases, database 120 controller may operate automatically without user 100 interaction. In some cases, database 120 may be external to causal multi-touch attribution apparatus 110. In some cases, database 120 may be included in multi-touch attribution apparatus 110. In some cases, database 120 may be included in the event tracking component and/or the time series component of multi-touch attribution apparatus 110.

Figure 2:
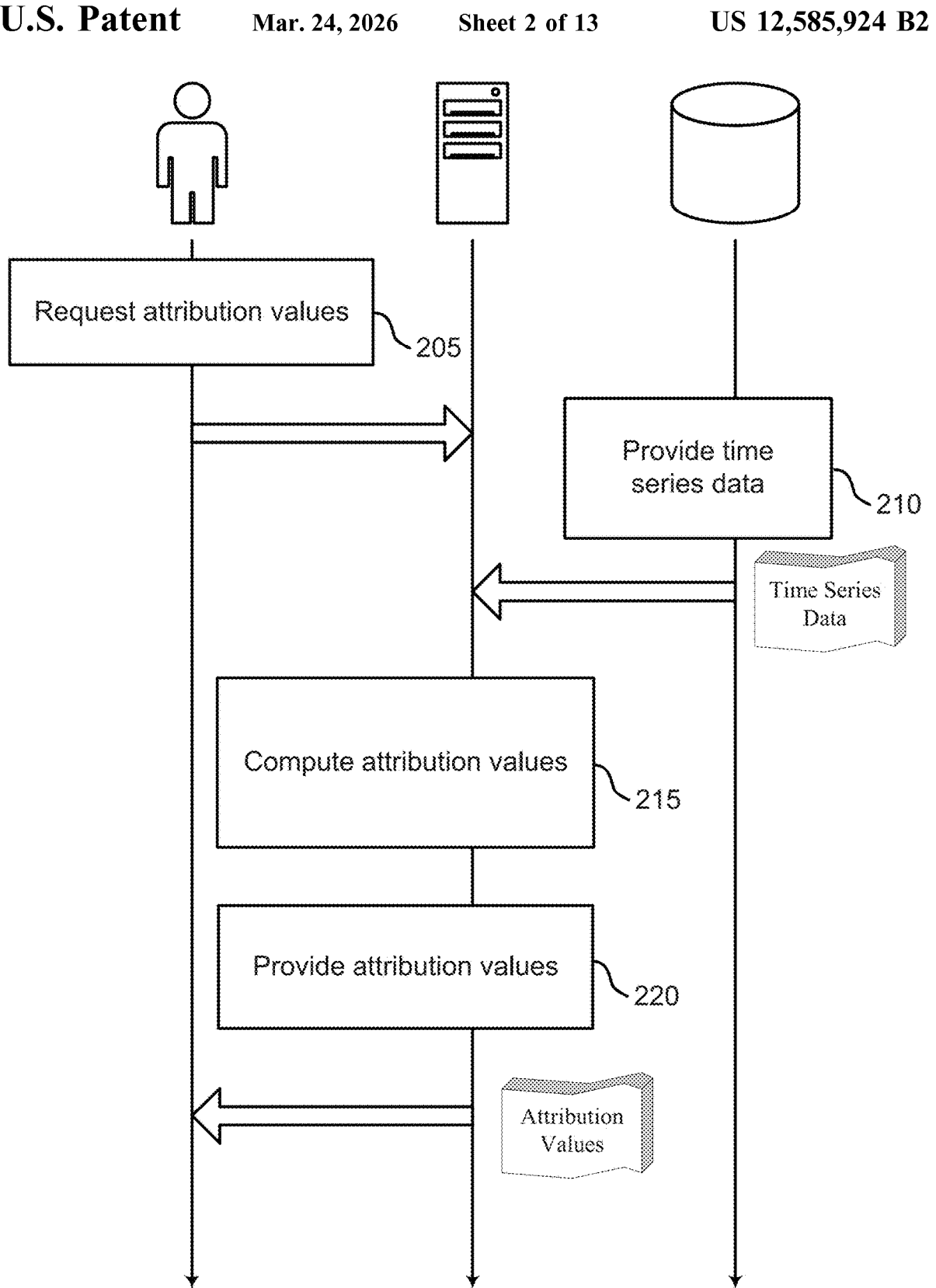
FIG. 2 shows an example of a causal multi-touch attribution process according to aspects of the present disclosure.

FIG. 2 shows an example of a process for causal multi-touch attribution according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the system requests attribution values corresponding to a given set of event data. In some cases, the operations of this step refer to, or may be performed by, a user via a user device as described with reference to FIG. 1.

For example, a user can instruct a user device to request attribution values for various precursor events in a dataset. The precursor events can each be associated with one or more event categories, and the user may wish to be provided with data that indicates the influence of particular precursor events, event categories, and/or stage transitions in a dataset on the occurrence of a later result event, such as a conversion. In some embodiments, the user can interact with and instruct the user device via a user interface (such as a graphical user interface) and/or input hardware such as a mouse, keyboard, touchscreen, etc.

At operation 210, the system provides time series data associated with the set of event data. In some cases, the operations of this step refer to, or may be performed by, a database as described with reference to FIG. 1.

For example, a causal multi-touch attribution apparatus such as the server described with reference to FIG. 1 may request the time series data relating to the dataset from the database in response to receiving the user request for attribution values. In response to receiving the time series data, the causal multi-touch attribution apparatus can identify an ordered series representing a set of precursor events corresponding to a result event, where each of the precursor events is associated with an event category from a set of event categories.

At operation 215, the system computes the requested attribution values. In some cases, the operations of this step refer to, or may be performed by, a server as described with reference to FIG. 1. In some cases, the operations of this step may be performed as described with reference to FIGS. 7-12.

For example, the server can generate a series of predictive values corresponding to the set of precursor events by computing a set of hidden vector representations for at least one of the precursor events using a temporal convolution network, and can then compute an attribution value for each of the event categories based on the series of predictive values.

At operation 220, the system provides the requested attribution values. In some cases, the operations of this step refer to, or may be performed by, a server as described with reference to FIG. 1. In some cases, the operations of this step may be performed as described with reference to FIG. 9.

For example, after the server computes the requested attribution values, the server can transmit the attribution values to the user device. The user device can display the attribution values to the user via a user interface and a display such as a screen, monitor, etc.

Figure 3:
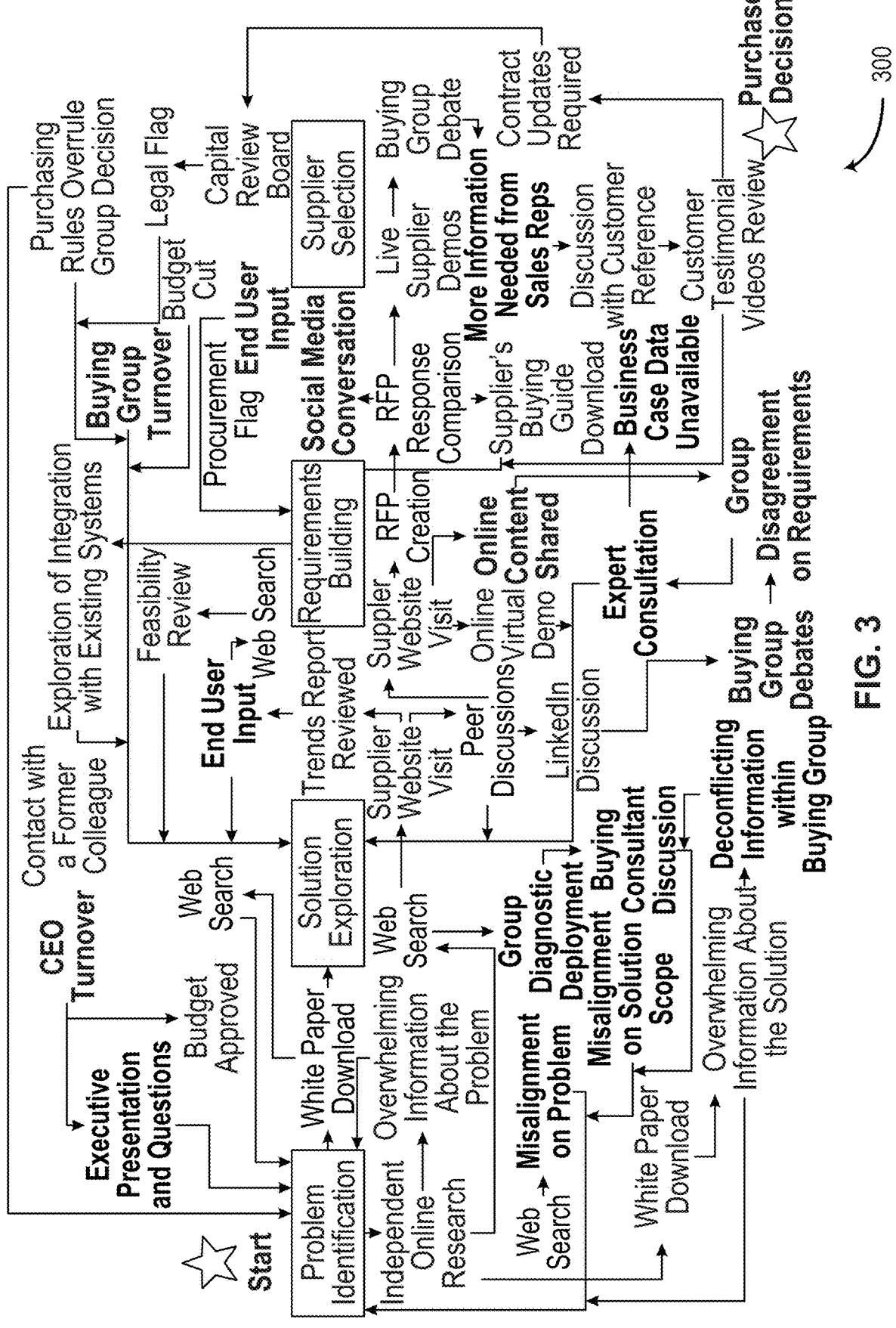
FIG. 3 shows an example of a business-to-business journey according to aspects of the present disclosure.

FIG. 3 shows an example of a business-to-business (B2B) customer journey according to aspects of the present disclosure.

Businesses track and store customer data available from interactions through different channels or event categories, such as paid-search, organic-search, blog-posts, form-submission, chat-bots, etc. The data can be used to build a customer journey as a sequence of touch-point interactions. A touch-point is a unit of interaction that includes interactions using marketing channels, on-site browsing or interactions with the sales team. A touch-point contains further information in the form of features defining the specifics of interaction, for example, channel used, timestamp of interaction, location of interaction, etc. Interactions (e.g., touch-points) and channels which contribute towards customer conversion may be identified in a multi-touch attribution (MTA) process. Multi-touch attribution can benefit, for example, the marketing and sales teams of a business. An example context for multi-touch attribution is B2B commerce, in which products such as enterprise software, cloud technology, etc., are sold by one company to another company.

B2B commerce involves transactions between companies where members of a buyer company interact with members of a seller company. For example, referring to FIG. 3, members of a buyer company may work with marketing and sales teams of a seller company using online or offline channels and undergo multiple stages of a B2B journey before making a purchase decision. A customer in a B2B setting undergoes multiple non-linear interactions and transitions between multiple stages before an eventual purchase decision. In some cases, a seller company may want to identify the stage transitions, channels, and touch-point attributes that contribute towards a purchase.

Thus, according to some aspects, event tracking component 300 monitors and records user interactions with online channels, such as a website, or offline channels, and identifies precursor events from the interactions, where at least a portion of the precursor events correspond to the user interactions with the website. In some cases, event tracking component 300 may communicate with a database described in accordance with aspects of the present disclosure, such as database 120 of FIG. 1, to store and retrieve event data relating to these user interactions.

Event tracking component 300 is an example of, or includes aspects of, the corresponding element described with reference to FIGS. 1 and 4.

Figure 4:
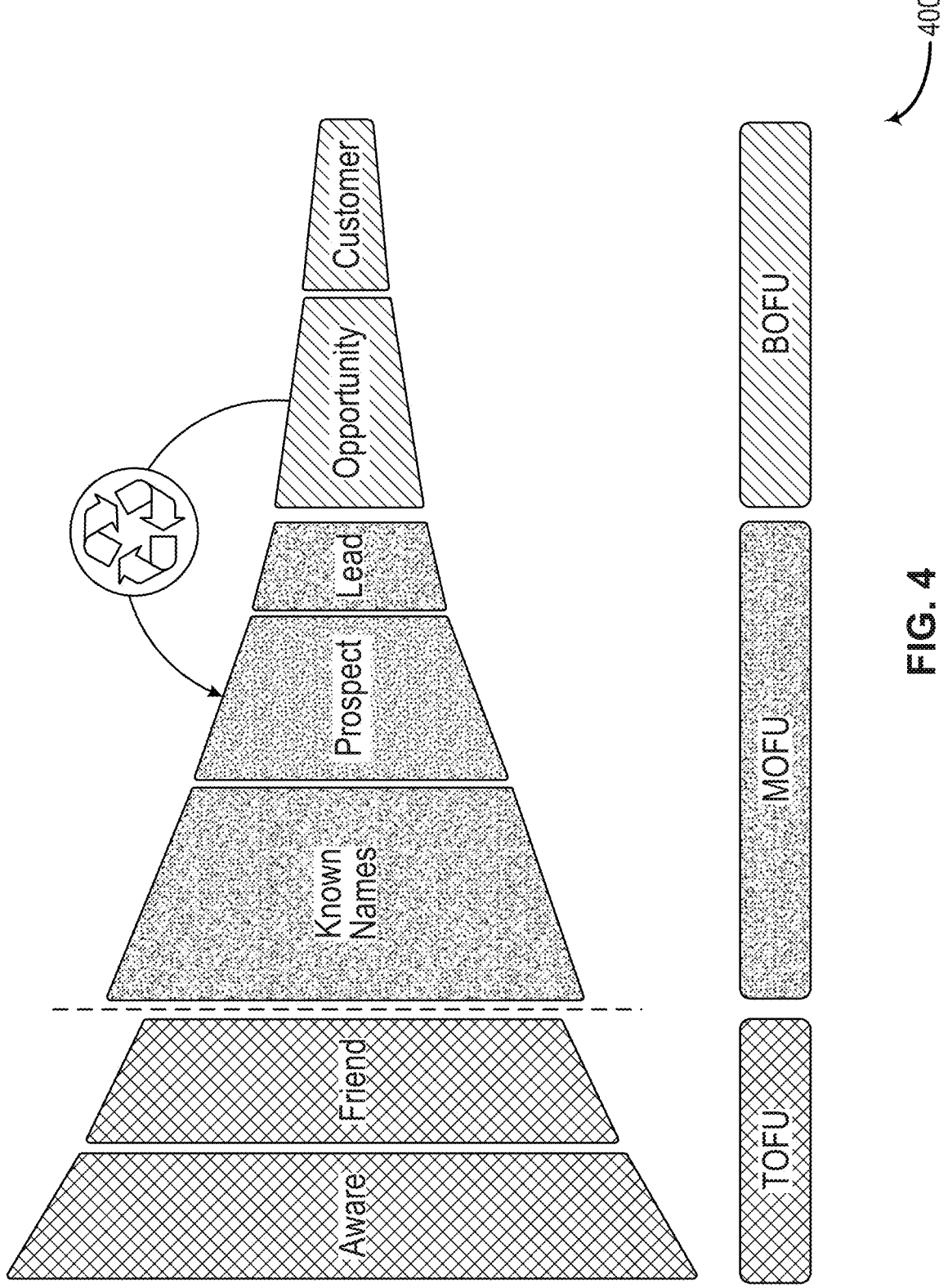
FIG. 4 shows an example of a business-to-business customer funnel according to aspects of the present disclosure.
Figure 5:
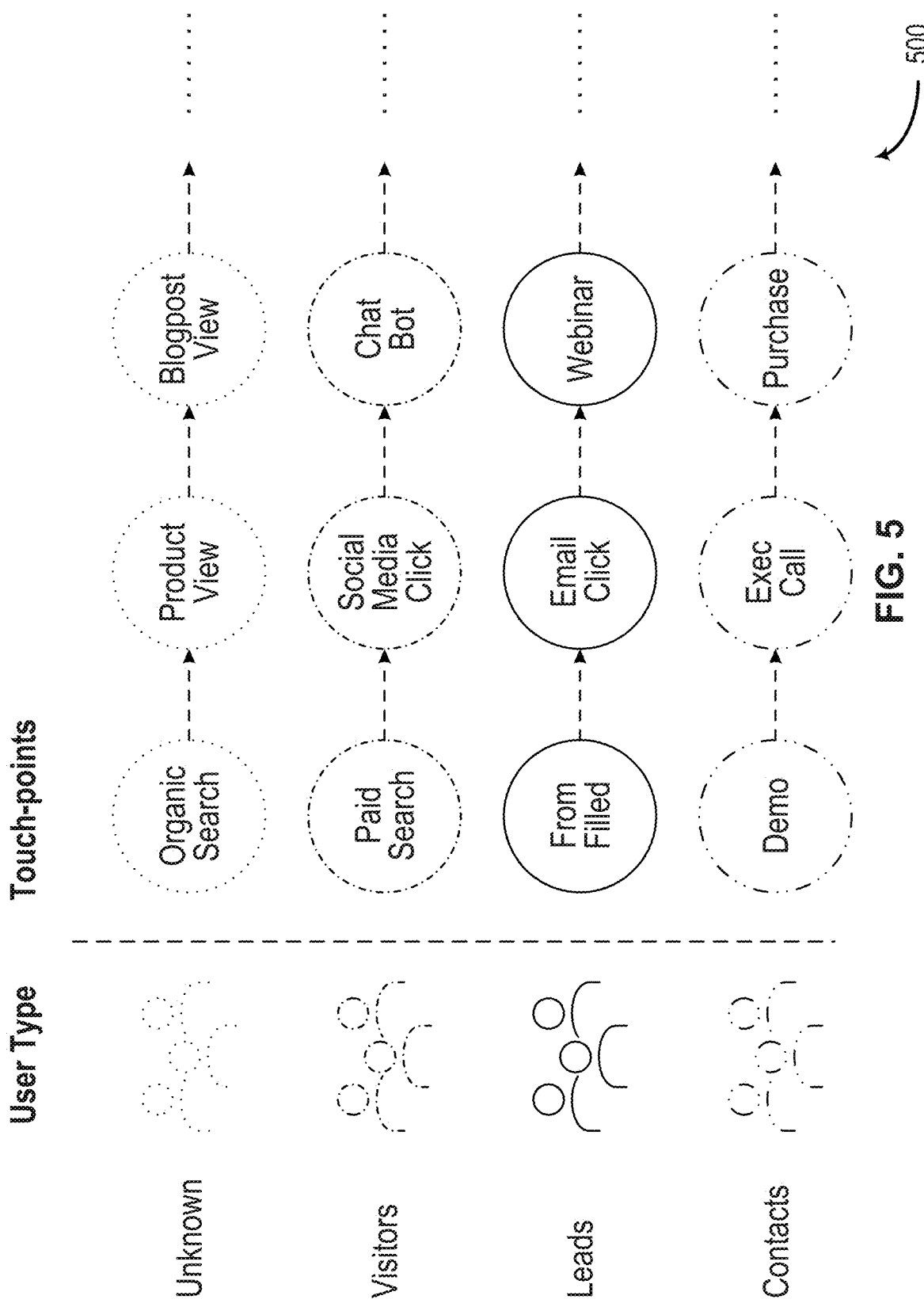
FIG. 5 shows an example of an ordered series of precursor events according to aspects of the present disclosure.

FIG. 4 shows an example of a business-to-business customer funnel according to aspects of the present disclosure. FIG. 5 shows an example of an ordered series of precursor events according to aspects of the present disclosure.

Referring to FIG. 4, event tracking component 400 may employ marketing automation software, such as software provided by Marketo (an Adobe® company), to track (e.g., monitor and record) user interactions in real time during a customer journey described with reference to FIG. 3. In some instances, multiple users from a buying company may interact with a seller via multiple channels during such a customer journey. Event tracking component 400 may divide the customer journey into stages depending on the type of interactions in the customer journey and may identify positional touch-points or milestones as precursor events on the basis of a progression in customer engagement and interest. Referring to FIG. 4, the positional touch-points may be considered transitions (i.e., stage transitions) between stages in a B2B "customer funnel". The stage transitions in a B2B funnel may include first-touch, lead-creation, opportunity creation, and customer-close. Event tracking component 400 can identify and record these stage transitions.

Referring to FIGS. 4 and 5, the first-touch stage may include unknown users from the customer account that interact with a seller via various marketing channels (or event categories). An account is a group of users from the buyer company responsible for purchase of a particular kind. In some cases, users of an account belong to multiple opportunities, where an opportunity is the possibility of a purchase identified by the seller company. The users are at the top of the funnel (TOFU) and belong to an "aware" stage. Users who provide identifying information, such as a name, email address, and the like, are transferred to a prospect stage in the middle of the funnel (MOFU), and this positional touch-point that depicts a transition from the "aware" to the "prospect" stage is referred to as "first-touch".

A visitor is a user from the buyer company who has interacted with the seller company using marketing channels. In some cases, a user transitions from the "aware" stage to being a visitor in a "prospect" stage by demonstrating a high level of interest, such as by filling forms and providing contact information. Visitors may have different relative levels of engagement with a seller company. Event tracking component 400 can identify potential buyers from among the visitors via engagement-based scoring, convert the potential buyers to leads, and transfer the potential buyers to the "lead" stage (also part of MOFU). A positional touch-point (e.g., a precursor event) that depicts a transition from the "prospect" to the "lead" stage is referred to as a "lead-creation" touch-point. For example, a visitor who performs interactions that indicate a relatively high interest in a purchase (such as by filling forms, providing an email address, etc.), can be converted into a potential buyer and then into a lead.

The leads can interact with sales representatives using online or offline channels (i.e., event categories). In some cases, event tracking component 400 can convert the leads to "contacts" and transfer the contracts to an "opportunity" stage at the bottom of the funnel (BOFU) based on the interest of the lead in making a purchase. For example, a lead who shows strong engagement with the sales representatives of the seller company qualifies as a contact. A contact is actively pursued by the sales team for a potential purchase. Alternatively, leads that are not ready to buy are recycled to the "prospect" stage. A positional touch-point (e.g., a precursor event) that depicts a transition from "lead" to "opportunity" is referred to as an "opportunity-creation" touch-point. An opportunity is created when strong engagement and inclination of purchase is shown by a lead. A created opportunity may be specified as a sequence of touch-points formed by combining touch-points in chronological order.

Next, contacts interact with a sales team through executive calls, demos, etc., and a decision on a purchase can take place. As a result, the contact may be transferred to a "customer" stage in BOFU, and this positional touch-point (e.g., a result event) that depicts a transition from "opportunity" to "customer" can be referred to as a "customer-close" touch-point.

A customer journey is considered complete if the journey goes through these four stages (i.e., the aware stage, the prospect stage, the opportunity stage, and the customer stage), the stage transitions of which can be identified by event tracking component 400 as precursor events, and the customer purchase decision (i.e., a result event) is known.

Thus, in some examples, event tracking component 400 may identify event data including various stages and stage transitions in a customer journey. In some examples, event tracking component 400 may monitor user interactions with a website, and at least some of the user interactions may correspond to precursor events. In some examples, event tracking component 400 can record a sale following user interactions with a website, and a result event may correspond to the sale. In some examples, event tracking component 400 can identify a plurality of users and associate each of the users with one or more precursor events. In some examples, event tracking component 400 can identify a same organization for each of a plurality of users.

In some examples, event tracking component 400 can provide recorded event data to time series component 500. Referring to FIG. 5, the time series component 500 can use this event data to identify one or more ordered series representing a plurality of precursor events (i.e., touch-points) corresponding to a result event, wherein each of the precursor events may be associated with an event category from a set of event categories (i.e., online and/or offline channels). In some examples, time series component 500 can identify an additional ordered series representing a plurality of additional precursor events corresponding to a result event, where the ordered series corresponds to a first event stage and the additional ordered series corresponds to a second event stage. In some examples, a set of event categories comprises a set of customer relationship management channels. In some examples, time series component 500 can include precursor events in an ordered series based at least in part on the same organization. In some examples, time series component 500 can identify training data including an ordered series representing a plurality of precursor events corresponding to a result event and ground truth conversion data, where each of the precursor events is associated with an event category from a set of event categories.

Event tracking component 400 is an example of, or includes aspects of, the corresponding element described with reference to FIGS. 1, 3 and 6. Time series component 500 is an example of, or includes aspects of, the corresponding element described with reference to FIGS. 1 and 6.

Some goals of an MTA process in the context of a customer journey described with reference to FIGS. 3-5 may be the attribution of credit of conversion to various stage transitions in the customer journey, the attribution of credit of conversions to touch-points in the customer journey, and the attribution of credit of each stage transition to touch-points.

However, in comparative examples, the analysis and derivation of useful attribution insights from B2B journeys that occur over long time periods (e.g., multiple years) may not be possible due to the presence of multiple touch-points with irregular time gaps between them. To overcome this difficulty, the systems and methods of the present disclosure can appropriately adjust for these time gaps to derive meaningful attribution values from the large and complex dataset of the B2B journey.

Furthermore, B2B journeys are non-linear due to the presence of multiple stakeholders in the buying company that execute a personal role in the buying process, leading to long term sequential dependencies between the touch-points. These dependencies may be causal (i.e., an interaction might cause a future interaction). However, existing data modelling techniques are not able to accurately capture such non-linear and long term causal dependencies, leading to biased attributions.

For example, conventional rule-based attribution methods pre-define an attribution rule without considering the data. In some cases, single-touch based attribution processes are used where credit is given to a single touch-point (i.e., the first or last point that are used in driving conversion). Extensions to these single-touch based attribution processes include linear, time-decay, u-shaped, w-shaped, and full-path attribution models. A linear model may provide equal credit for all touch-points. Building on a linear model, a time-decay model may re-weigh the attribution credits in proportion to event recency with respect to a conversion. Other rule-based models, such as U-shaped, w-shaped, and full-path models, may consider pre-defined rules to assign increased credit to various touch-points and distribute the remaining credit among the remaining touch-points, but rule-based attribution methods are inaccurate as they do not fully consider the underlying data distribution of the touch-points.

In an alternative approach, conventional data-driven methods model an underlying distribution of touch-points and purchase labels to compute attribution scores. In some cases, data-driven methods may include a purchase prediction model and compute touch-point or channel importance that are used as attributions. For example, a bagged logistic regression model may be used for conversion prediction and computing attributions based on model weights, and a survival analysis-based technique can take the intrinsic conversion rate of users into account. Alternatively, attributions in online advertising may be modelled using a solution concept (e.g., Shapley values) and corresponding modifications derived from cooperative game theory. However, conventional data-driven methods do not accurately capture sequential dependencies in a customer journey.

In an attempt to capture these sequential dependencies, an attention based recurrent neural network (ARNN) method can be used, where attention weights are used to compute touch-point attributions. In some comparative examples, both customer impressions and website clicks can inform a sequence-to-sequence model called dual attention RNN (DARNN), which can predict click rates for impressions with overall conversions. In some comparative examples, RNN-based models can use attention weights in the model to determine channel attributions at an aggregate level. In some comparative examples, an RNN-based process can compute attribution scores using a solution concept from game theory (i.e., Shapley values) to predict conversions.

However, conventional neural network-based methods are not able to accurately return attribution scores of touch-points for each customer journey as relative weights are assigned independently of each customer journey. Additionally, conventional neural network-based methods do not accurately credit touch-points, stage transitions, and event categories in B2B journeys, as conventional neural networks only encode sequential information and have less access to past touch-points that can capture longer sequential dependencies. For example, conventional RNN models include vanishing or exploding gradients on long journeys in a B2B setting that adversely affect the models' accuracy.

The present disclosure describes a system and methods for data-driven causal multi-touch attribution that can provide more accurate attribution values to a user than conventional multi-touch attribution processes. In some cases, a model to predict a conversion of a customer journey is built, and explanation scores (e.g., model parameters, attention weights, etc.) are used for evaluating attributions.

System Architecture

An apparatus for causal multi-touch attribution is described. One or more aspects of the apparatus include a time series component configured to generate an ordered series representing a plurality of precursor events corresponding to a result event, wherein each of the precursor events is associated with an event category from a set of event categories; a temporal convolution network configured to generate a series of predictive values corresponding to the plurality of precursor events by computing a plurality of hidden vector representations for at least one of the precursor events; and an attribution component configured to compute an attribution value for each of the event categories based on the series of predictive values.

Some examples of the apparatus further include a logistic regression component configured to perform logistic regression on a subset of the precursor events.

Some examples of the apparatus further include an additional temporal convolution network configured to compute a plurality of additional hidden vector representations for each of a plurality of additional precursor events corresponding to a different stage than the plurality of precursor events, wherein the series of predictive values is based on the plurality of hidden vector representations and the plurality of additional hidden vector representations.

Some examples of the apparatus further include an event tracking component configured to record the plurality of precursor events.

Some examples of the apparatus further include a training component configured to update parameters of the temporal convolution network based on a loss function.

FIG. 6 shows an example of a causal multi-touch attribution system according to aspects of the present disclosure. The example shown includes processor unit 600, memory unit 605, training unit 610, event tracking component 615, time series component 620, logistic regression component 625, temporal convolution network 630, multistage network 635, and attribution component 640.

A processor unit 600 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 600 is configured to operate a memory array using a memory controller. In other cases, a memory controller is integrated into the processor unit 600. In some cases, the processor unit 600 is configured to execute computer-readable instructions stored in a memory to perform various functions. In some embodiments, a processor unit 600 includes special purpose components for modem processing, baseband processing, digital signal processing, or transmission processing.

Examples of a memory unit 605 device include random access memory (RAM), read-only memory (ROM), or a hard disk. Examples of memory unit 605 devices include solid state memory and a hard disk drive. In some examples, memory is used to store computer-readable, computer-executable software including instructions that, when executed, cause a processor to perform various functions described herein. In some cases, the memory unit 605 contains, among other things, a basic input/output system (BIOS) which controls basic hardware or software operation such as the interaction with peripheral components or devices. In some cases, a memory unit 605 controller operates memory cells. For example, the memory unit 605 controller can include a row decoder, column decoder, or both. In some cases, memory cells within a memory unit 605 store information in the form of a logical state.

According to some aspects, training unit 610 identifies training data including an ordered series representing a set of precursor events corresponding to a result event and ground truth conversion data, generates a series of predictive values corresponding to the set of precursor events, computes a conversion prediction based on the series of predictive values, computes a loss function that compares the conversion prediction to the ground truth conversion data, and trains a temporal convolution network and/or temporal convolution networks according to embodiments of the present disclosure, such as temporal convolution network 630, based on the loss function. Further description of a process by which the training unit 610 may train a temporal convolution network is provided with reference to FIG. 13.

According to some aspects, event tracking component 615 monitors and records various online and offline user interactions and events in various datasets. In some examples, event tracking component 615 monitors user interactions with a website. In some examples, event tracking component 615 records a sale (e.g., a conversion) following the user interactions with the website. In some examples, event tracking component 615 identifies a plurality of users from the dataset. In some examples, event tracking component 615 identifies an organization for each of the plurality of users. In some examples, event tracking component 615 is an example of, or includes aspects of, the corresponding element described with reference to FIGS. 1 and 3-4.

According to some aspects, time series component 620 identifies an ordered series representing a set of precursor events corresponding to a result event, where each of the precursor events is associated with an event category from a set of event categories. In some examples, time series component 620 generates a feature vector for each of the set of precursor events, where the temporal convolution network 630 takes the feature vector as input. In some examples, time series component 620 identifies an additional ordered series representing a set of additional precursor events corresponding to the result event, where the ordered series corresponds to a first event stage and the additional ordered series corresponds to a second event stage. In some examples, the set of event categories includes a set of customer relationship management channels. In some examples, time series component 620 includes the precursor events in the ordered series based on the same organization.

According to some aspects, time series component 620 identifies training data including an ordered series representing a set of precursor events corresponding to a result event and ground truth conversion data, where each of the precursor events is associated with an event category from a set of event categories. According to some aspects, time series component 620 is configured to generate an ordered series representing a plurality of precursor events corresponding to a result event, wherein each of the precursor events is associated with an event category from a set of event categories. Time series component 620 is an example of, or includes aspects of, the corresponding element described with reference to FIGS. 1 and 5.

According to some aspects, logistic regression component 625 identifies an input size for the temporal convolution network 630. In some examples, logistic regression component 625 determines that a number of the precursor events in the ordered series exceeds the input size. In some examples, logistic regression component 625 performs logistic regression on a subset of the precursor events based on the determination, where the attribution value for each of the event categories is based on the logistic regression. According to some aspects, logistic regression component 625 is configured to perform logistic regression on a subset of the precursor events.

Logistic regression component 625 is an example of, or includes aspects of, the corresponding element described with reference to FIG. 8.

According to some aspects, temporal convolution network 630 generates a series of predictive values corresponding to the set of precursor events by computing a set of hidden vector representations for at least one of the precursor events using a temporal convolution network 630. In some aspects, each of the set of hidden vector representations at an intermediate layer of the temporal convolution network 630 is computed based on previous precursor events. In some aspects, each of the set of hidden vector representations at the intermediate layer is computed independent of subsequent precursor events. In some examples, temporal convolution network 630 computes a set of additional hidden vector representations for each of the set of additional precursor events using an additional temporal convolution network 630, where the series of predictive values is based on the set of hidden vector representations and the set of additional hidden vector representations.

According to some aspects, temporal convolution network 630 generates a series of predictive values corresponding to the set of precursor events by computing a set of hidden vector representations for at least one of the precursor events using a temporal convolution network 630.

According to some aspects, temporal convolution network 630 is configured to generate a series of predictive values corresponding to the plurality of precursor events by computing a plurality of hidden vector representations for at least one of the precursor events. In some examples, temporal convolution network 630 is configured to compute a plurality of additional hidden vector representations for each of a plurality of additional precursor events corresponding to a different stage than the plurality of precursor events, wherein the series of predictive values is based on the plurality of hidden vector representations and the plurality of additional hidden vector representations.

Temporal convolution network 630 is an example of, or includes aspects of, the corresponding element described with reference to FIG. 7.

According to some aspects, multistage network 635 combines output from the temporal convolution network 630 and the additional temporal convolution network 630 to produce a combined hidden representation. In some examples, multistage network 635 processes the combined hidden representation using a combined neural network layer, where the series of predictive values are based on the output of the combined neural network layer. In some aspects, the first stage and the second stage includes different stages of a customer relationship management funnel. In some examples, multistage network 635 computes stage attribution values for each of the different stages of the customer relationship management funnel.

Multistage network 635 is an example of, or includes aspects of, the corresponding element described with reference to FIG. 8.

According to some aspects, attribution component 640 computes an attribution value for each of the event categories based on the series of predictive values. According to some aspects, attribution component 640 computes a conversion prediction based on the series of predictive values. In some examples, attribution component 640 computes a loss function that compares the conversion prediction to the ground truth conversion data.

According to some aspects, attribution component 640 is configured to compute an attribution value for each of the event categories based on the series of predictive values. According to some aspects, attribution component 640 is configured to provide one or more attribution values. For example, the one or more attribution values may be provided to a cloud and/or a user device as described with reference to FIG. 1.

Attribution component 640 is an example of, or includes aspects of, the corresponding element described with reference to FIG. 8.

FIG. 7 shows an example of a temporal convolution network 700 according to aspects of the present disclosure.

Temporal Convolutional Networks (TCN) refer to an architecture for convolutional sequential prediction that may include multiple applications. For example, TCN may be applied for action segmentation or music and language modelling. TCNs use one-dimensional fully convolutional networks with causal convolutions that convolve output at time i only with elements at time<i, in the previous layer to achieve dependence of outputs on past inputs. Dilated convolutions that have exponentially large receptive field are used to look in the past inputs. The dilated convolutional operation on a 1D sequence $x \in \mathbb{R}^n$ using filter f:{0, . . . , k−1} at element s can be defined as:

$$(x * f)(s) = \sum_{i=0}^{k-1} f(i) x_{s-d*i} \tag{1}$$

where d is the dilation factor, k is filter size and $s-d_i$ depicts past direction. By increasing the dilation factor d (in some cases, d is increased exponentially with depth, i.e., $d=O(2^i)$ at layer i). Additionally, the receptive field of the TCN can be increased by choosing a large filter size k which provides a large effective history. A TCN includes multiple (e.g., L) layers of dilated convolutions. Inputs and outputs to the layers of dilated convolutions have the same length and use the same padding. In some cases, TCNs include parallelization while training and evaluation, flexibility in receptive field size for high control on the memory of the model, stable gradients due to absence of back-propagation in the temporal direction, low memory requirement, etc.

Referring to FIG. 7, a sequence modelling task in temporal convolution network 700 builds a neural network that uses a temporal sequence $(\overline{x}_1, \ldots, \overline{x}_n)_2$ (e.g., an ordered series of precursor events provided by a time series component according to aspects and embodiments of the present disclosure) as input with corresponding outputs $y_1, \ldots, y_n$ (e.g., result events) and outputs a series of predictive values $\hat{y}_1, \ldots, \hat{y}_n$ as prediction for the result events while satisfying the causal constraint that for $i \in \{1, \ldots, n\}$, $y_i$ only depends on the past, i.e., on inputs $\overline{x}_1, \ldots, \overline{x}_i$ and not on future inputs $\overline{x}_{i+1}, \ldots, \overline{x}_m$.

Layer-wise relevance propagation (LRP) is a technique of explaining neural network predictions. Temporal convolution network 700 can decompose the predicted quantity into relevance scores of hidden nodes at each layer (including the input layer) for an input prediction. Temporal convolution network 700 can interpret the scores as contributions of nodes at layer 1 towards prediction for each layer l. The relevance score of node d at layer 1 is denoted as $R_d^{(l)}$. In some cases, $R_d^{(l)}$s sum up to the prediction output at each layer l, i.e., $f(\overline{x}) = \sum_{d \in l} R_d^{(l)}$ Temporal convolution network 700 can break the relevance scores into messages $R_{i \leftarrow j}^{(l,l+1)}$ sent from node j at layer l+1 to node i at layer l. For node i on layer l, sum of messages coming from nodes having i as an input, equals relevance for node i. Similarly for node j on layer l+1, the relevance can be written as sum of the messages going from j to the input nodes:

$$R_i^{(l)} = \sum_{j:i \text{ is input for } j} R_{i \leftarrow j}^{(l,l+1)} \tag{2}$$

-continued $$R_j^{(l+1)} = \sum_{i: i \text{ is input for } j} R_{i \leftarrow j}^{(l,l+1)} \tag{3}$$

A rule for relevance propagation is set for temporal convolution network 700 to calculate relevance of each node in the network. In some cases, relevance is calculated using a backwards approach and equals deciding a rule to break down relevance of a node $R_j^{(l+1)}$ into the messages $R_{i \leftarrow j}^{(l,l+1)}$ for the nodes at a given layer l+1. The messages are summed at nodes in layer l and the corresponding relevance values are computed. Relevance is assumed equal to the prediction f(x) of the network at the output node. Using the propagation rules, temporal convolution network 700 back-propagates the prediction to the inputs using the propagation rules. For an input node i and a hidden node j in the network, such that i, j are connected by a path, the relevance of i towards output of j may be an accumulation of messages on paths from i to j. The relevance of inputs is obtained on the output prediction when j is the output node. Different propagation rules exist for different kind of nodes. For example, for node j at layer l+1 computing a linear function $z_j = \sum_i z_{ij} + b_j$ of the inputs $z_{ij}$s, where $b_j$ is the bias term, a possible decomposition is:

$$R_{i \leftarrow j}^{(l,l+1)} = \frac{z_{ij}}{z_j} R_j^{(l+1)} \tag{4}$$

Consider a dense layer that calculates $Y = W\overline{a} + b$, where $\overline{a}$ is the vector of activations from the previous layer and W is the weight matrix of the dense layer. Given relevance vector $\overline{R}$ comprising of relevance values of the output of a layer and $\epsilon > 0$, propagation to inputs is provided as:

$$z = W\overline{a} + \epsilon, s = \overline{R}/z, c = W^T s, R = a \odot c \tag{5}$$

where $\overline{R}/z$ represents component-wise division and $R = a \odot c$ is the final propagated relevance of the layer.

LRP of a dilated convolutional layer is given as:

$$z = Conv(a, \text{kernel} = W) + b + \epsilon, \tag{6}$$

$$c = Conv\_backprop(\text{filter} = w, \text{grads} = s)$$

where Conv_backprop is the backwards propagation of convolution, and where $R = a \odot c$ is the final propagated relevance for the given layer.

The output of a skip connection is Y=U+H(U), where H is a deep network and U is an input. If H(U) is given as V and elementwise addition is used as a special case of dense layer and LRP applied for linear networks, relevance values of U and V are given as:

$$R(U) = \frac{U \odot R(Y_{output})}{U + V}, R(V) = \frac{V \odot R(Y_{output})}{U + V} \tag{7}$$

where $\odot$ is the element-wise product of vectors.

According to some aspects, temporal convolution network 700 may employ a region perturbation technique. For example, in some cases, a customer journey may be given as a time ordered sequence of touch-points $x=(\overline{x}_1, \ldots, \overline{x}_n)$, and $\mathcal{O} = \{\overline{r}_1, \ldots, \overline{r}_L\}$ be a set of subsets of $\{\overline{x}_1, \ldots, \overline{x}_n\}$. For $\overline{r}_i \in \mathcal{O}$, $h_i = \mathcal{H}(x, f, \overline{r}_i)$ is a heatmapping function (computed using the attribution methodology) derived from a class discriminant f used for classification. The heat mapping function indicates the importance of subset $\bar{r}_p$ of touch-points for representing the eventual predicted label of the journey. The heatmap values are assumed in decreasing order i.e., $h_1 > \ldots > h_L$ without loss of generality. A perturbation process known as the most relevant first (MoRF) process is defined by the recursive formula:

$$x_{MoRF}^{(0)} = x$$

$$\forall 1 \leq k \leq L : x_{MoRF}^{(k)} = g(x_{MoRF}^{(k-1)}, \bar{r}_k) \tag{8}$$

where an ordered sequence of touch-points $x_{MoRF}^{(0)}$ is created by using a function g that removes the touch-points in set $\bar{r}_k$ from the sequence $x_{MoRF}^{(k-1)}$. The relevance (i.e., heatmap values) of the $\bar{r}_i$ are assumed to be in decreasing order and therefore subsets are removed in descending order of relevance. A metric, i.e., area over the MoRF perturbation curve (AOPC), compares different attribution methodologies (and the corresponding heat maps generated):

$$AOPC = \frac{1}{L+1} \left\langle \sum_{k=0}^{L} f\left(x_{MoRF}^{(0)}\right) - f\left(x_{MoRF}^{(k)}\right) \right\rangle_{p(x)} \tag{9}$$

where $\langle \cdot \rangle_{p(x)}$ denotes average over the journeys in the dataset. High values of AOPC are obtained when $\mathcal{O}$ is ordered in decreasing order of relevance (i.e., the attribution based heatmap values $h_p$). For example, LRP has high values of AOPC and is used as an explanation mechanism.

Temporal convolution network 700 is an example of, or includes aspects of, the corresponding element described with reference to FIGS. 6 and 9.

FIG. 8 shows an example of an attribution component 800, a logistic regression component 805, and a multistage network 810 according to aspects of the present disclosure.

According to some aspects, attribution component 800 develops a model containing r different components (networks) $S_1, \ldots, S_r$, each representing a stage transition in a customer journey. Each network $S_1, \ldots, S_r$ may store and retrieve event data relating to these user interactions. A given network $S_i$ takes the sub-sequence $X_i = (\bar{x}_1, \ldots, \bar{x}_{n_i})$ as input and outputs a vector $Y_i \in \mathbb{R}^h$ for a tuned dimension h. At an output node, attribution component 800 concatenates $Y_1, \ldots, Y_r$, i.e., and applies a dense layer, giving $Y_o = (Y_o(0), Y_o(1)) = \text{Dense}(Y_1, \ldots, Y_r) \in \mathbb{R}^2$ followed by a softmax to output $Y_{pred}$, the probability of conversion (i.e., the attribution value):

$$Y_{pred} = \frac{e^{Y_o[1]}}{e^{Y_o[0]} + e^{Y_o[1]}} \tag{9}$$

A given network $S_i$ can be include sub-network $LR_i$ of logistic regression component 805 and $TCN_i$ of multistage network 810, which can respectively output $Y_{LR_i}$ and $Y_{TCN_i}$. A given TCN $TCN_i$ may be a temporal convolution network described in accordance with aspects of the present disclosure, such as temporal convolution network 700 of FIG. 7. The network $LR_i$ applies a logistic regression to features computed from a prefix $X_{LR_i} = (\bar{x}_1, \ldots \bar{x}_{m_i})$ (i.e., for a tuned $m_i \leq n_i$) of the input sequence $X_i$. Multistage network 810 feeds suffix $X_{TCN_i} = (\bar{x}_{m_i+1}, \ldots, \bar{x}_{n_i})$ as input to $TCN_i$, which applies a vanilla TCN on the suffix $X_{TCN_i}$. The input is split, and different models are applied since the sequential order is close to stage transition and splitting of input enables dealing with long sequences. Therefore, a combination of logistic regression and temporal convolution networks can minimize a loss of touch-point information. In some examples, multistage network 810 computes the output $Y_i$ of $S_i$ by concatenating $Y_{LR_i}$ with $Y_{TCN_i}$ and applying a dense layer followed by ReLU activation i.e., $Y_i = \text{ReLU}(\text{Dense}(Y_{LR_i}, Y_{TCN_i}))$.

In some aspects, logistic regression component 805 includes a model that acts on a featurized version of the input $k_{LR_i}$. Features $z_i = (\bar{z}_1, \ldots, \bar{z}_c) \in \mathbb{R}^c$ are created, where c is the number of channels (i.e., event categories) and $z_j$ is a count of the number of touch-points (i.e., precursor events) in $X_{LR_i}$ that occur through channel j. In some examples, logistic regression component 805 can apply a linear network followed by a ReLU activation after creation of features $z_i$ to compute $Y_{LR_i} = \text{ReLU}(w_0 + \Sigma_{j=1} w_j z_j)$, where $w_j$ are weights to be learned. $Y_{LR_i}$ can then be fed into the computation of $Y_i$.

In some aspects, multistage network 810 includes a $TCN_i$ network that takes the sequence $X_{TCN_i} = (\bar{x}_{m_i+1}, \ldots, \bar{x}_{n_i})$ as input and outputs $Y_{TCN_i}$. In these aspects, the network architecture of $TCN_i$ is similar to the layered TCN model. An input touch-point is defined to be in $\mathbb{R}^p \times \mathbb{N}^q$; in other words, the first p features are numeric and the last q features are discrete. The discrete features are passed through an embedding layer that maps the features into numeric vectors of length e called embedding dimension. Therefore, the input to the TCN block is a $(n_i - m_i)$ long sequence of vectors in $\mathbb{R}^{p+eq}$. A TCN model with L hidden layers is applied on the inputs. Dilated convolutions with dilation factor $2^l$ for layer l along with a large filter size k are used to capture long term memory. In some cases, the output at the $L^{th}$ (i.e., final) layer of the TCN is $\bar{y}_1, \ldots, \bar{y}_{n_im_i}$. The output is sliced to extract the last output, i.e., $\bar{y}_{n_im_i} = (y^1, \ldots, y^d) \in \mathbb{R}^d$, where d is the filter size used at $L^{th}$ layer. Lastly, a linear network with learned weights $(v_0, \ldots, v_d)$ is applied on the output to provide:

$$Y_{TCN_i} = v_0 + \sum_{i=1}^{d} v_i y^i \tag{10}$$

which is fed into the computation of $Y_i$.

In some aspects, attribution component 800 applies a layer-wise relevance propagation framework on trained models. In some aspects, a rule for relevance back-propagation is set from the output to the inputs. Additionally, relevance of the nodes with respect to output $Y_o(1)$ are computed for customer journeys that include conversion, as the relevance captures the conversions. The attribution component 800 calculates the relevance values for the network and interprets the relevance values as attribution values (i.e., values that provide attributions of stage transitions and touch-points).

In some aspects, attribution component 800 computes the attribution of an $i^{th}$ stage transition as relevance $R_i$ of the output node of $S_i$ with respect to $Y_o(1)$. The dense layer propagation rule is used as $Y_o(1)$ is computed using a dense layer on outputs $Y_1, \ldots, Y_r$.

In some aspects, attribution component 800 attributes conversion to touch-points by back-propagating $Y_o(1)$ to the touch-points in the input sequence $X =, (\bar{x}_1, \ldots, \bar{x}_n)$; i.e., propagating each $R_i$ to the inputs of $S_i$ i.e., $\{\bar{x}_1, \ldots, \bar{x}_{n_i}\}$. $R_i$ is propagated to output nodes of $LR_i$ and $TCN_i$. In some aspects, a dense layer propagation rule is used that results in relevance values $R_{LR_i}$, $R_{TCN_i}$ for outputs of the two networks $LR_i$ and $TCN_i$. In some aspects, $Y_i$ is computed using a dense layer on $Y_{LR_i}$, $Y_{TCN_i}$ followed by ReLU. Next, a causal correction can be performed to adjust for causal dependence of the $TCN_i$ output (i.e., $Y_{TCN_i}$) on $LR_i$ inputs $X_{LR_i} = (\bar{x}_1, \ldots, \bar{x}_{m_i})$, as the inputs $X_{LR_i}$ of $LR_i$ occur early in time.

In some aspects, a training component according to aspects and embodiments of the present disclosure can train a separate model to predict $Y_{TCN_i}$ from $X_{LR_i} = (\bar{x}_1, \ldots, \bar{x}_{m_i})$ using hidden representations from a trained LR-TCN model. In some aspects, a training component according to aspects and embodiments of the present disclosure can train a ridge regression model to predict $Y_{TCN_i}$ using the channel frequencies $z_1 = (z_1, \ldots, z_c) \in \mathbb{R}^c$ to obtain a prediction $\hat{Y}_{TCN_i}$ for $Y_{TCN_i}$. The prediction $\hat{Y}_{TCN_i}$ is used to propagate relevance $R_{TCN_i}$ to inputs of $LR_i$ and $TCN_i$:

$$R_1 = \left(\frac{\hat{Y}_{TCN_i}}{Y_{TCN_i}}\right) R_{TCN_i} \quad (11)$$

$$R_2 = \left(\frac{Y_{TCN_i} - \hat{Y}_{TCN_i}}{Y_{TCN_i}}\right) R_{TCN_i} \quad (12)$$

$R_{LR_i}$ is propagated to the nodes that compute channel frequencies $(\bar{z}_1, \ldots, \bar{z}_c)$, using a dense layer propagation rule. In a similar manner, $R_1$ is propagated to the nodes that compute channel frequencies $(\bar{z}_1, \ldots, \bar{z}_c)$ using a dense layer propagation rule and then to input touchpoints of $LR_i$ by distributing relevance of node for channel $j \in \{1, \ldots, c\}$ (computing $z_j$) uniformly to touch-points through channel j. In some cases, the training component can use ridge regression to compute channel frequencies where a channel is away from a stage transition, resulting in less dependence on sequential order. Alternatively, in some cases, a training component according to aspects and embodiments of the present disclosure can compute channel frequencies for LRP. $R_2$ is propagated inside $TCN_i$ by using LRP for dilated convolutional layers and skip connections. These new propagations correct for the dependence of $Y_{TCN_i}$ (and therefore $X_{TCN_i}$) on $X_{LR_i}$ and can therefore provide accurate causal credit to $LR_i$ and $TCN_i$. The relevance at each input touch-point is accumulated and the corresponding attribution is obtained after the propagation is complete for the stage transitions.

In some aspects, attribution component 800 attributes stage transitions to touch-points while considering propagations from a single stage transition. For example, the credit of stage transition i is attributed to the touch-points in $S_i$ by considering propagation of $R_i$ backwards to the touch-points in sequence $X_i$.

Attribution component 800, logistic regression component 805, and multistage network 810 are examples of, or includes aspects of, the corresponding elements described with reference to FIG. 6.

Figure 9:
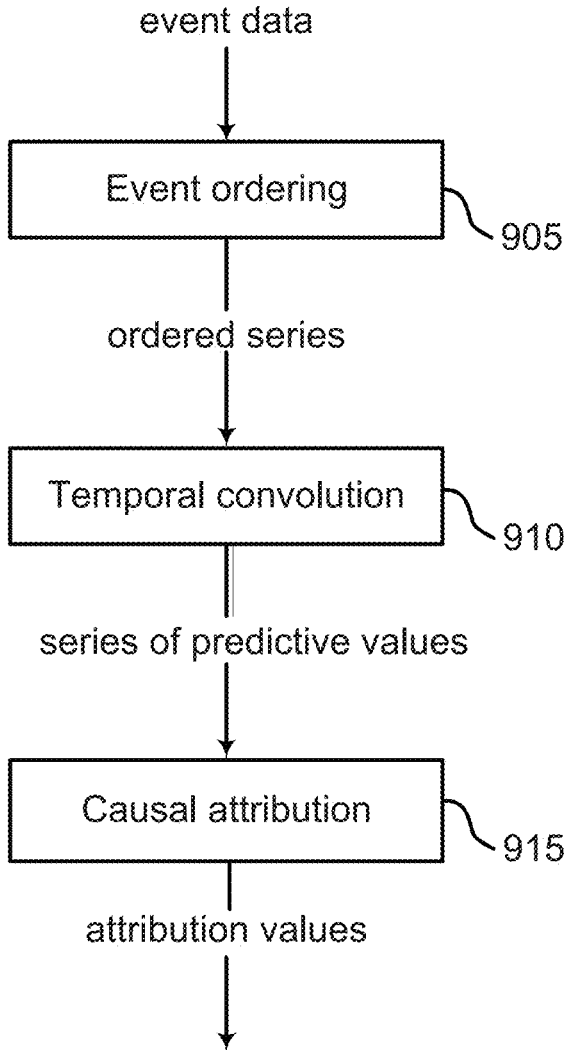
FIG. 9 shows an example of a causal multi-touch attribution process according to aspects of the present disclosure.

FIG. 9 shows an example of a causal multi-touch attribution process according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system takes event data as an input and outputs an ordered series by performing events ordering. In some cases, the operations of this step refer to, or may be performed by, a time series component as described with reference to FIGS. 5-6.

At operation 910, the system takes the ordered series as an input and outputs a series of predictive value by performing temporal convolution. In some cases, the operations of this step refer to, or may be performed by, a temporal convolution network as described with reference to FIGS. 6-8.

At operation 915, the system takes the series of predictive values as an input and outputs attribution values by performing causal attribution. In some cases, the operations of this step refer to, or may be performed by, an attribution component as described with reference to FIGS. 6 and 8.

In some examples, causal multi-touch attribution systems and methods according to aspects and embodiments of the present disclosure can process a B2B customer journey dataset obtained from marketing automation software such as Adobe® Marketo.

For example, in the customer journey dataset, the seller company may be Adobe® Marketo and buyers may be different businesses interested in the marketing automation related offerings of Adobe® Marketo. The dataset may comprise A buyer accounts spanning O opportunities that contain T touch-points. The touch-points may occur through C channels (i.e., event categories) between dates $D_1$ and $D_2$. The channels may include online marketing channels (e.g., user clicks on an advertisement), on-site behavior (e.g., form fills by user), and sales channels (e.g., sales calls). Causal multi-touch attribution systems and methods according to aspects and embodiments of the present disclosure can combine touch-points from a same opportunity using a unique identifier (e.g., opportunity ID) and obtain the time-stamp and the channel associated with a touch-point. The touch-points at which stage transitions occur can be accessed using raw touch-point level information.

In some examples, multi-touch attribution can be performed using a model explanation technique that provides attribution values for precursor events (stage transitions and/or touch-points) for one or more event categories (on-line and/or offline channels). In some cases, a general situation with a maximum of r possible transitions for each customer journey are considered. The inputs are created using a feature creation process, and each featurized customer journey looks like a sequence of k+1 numbers $n_1, \ldots, n_k$ and y, where $n_i$ i$\in \{1, \ldots, r\}$ correspond to the r stage transitions and y is the purchase label, or a temporal sequence $X = \{\bar{x}_1, \ldots, \bar{x}_n\}$ ($n = n_k$) of touch-points where $\bar{x}_1$ occurs before $\bar{x}_2$ etc. Each $\bar{x}_i$, i$\in \{1, \ldots, n\}$ is a vector in $\mathbb{R}^p \times \{}^q$, i.e., first p co-ordinates are numeric and last q co-ordinates are discrete.

In some examples, causal multi-touch attribution systems and methods according to aspects and embodiments of the present disclosure can use a feature creation algorithm to represent a customer journey. In some cases, the feature creation algorithm can build training, testing, and validation datasets. For example, a customer journey $X = (\bar{x}_1, \ldots, \bar{x}_n)$ may be ordered by time (i.e., $\bar{x}_1$ occurs before $\bar{x}_2$, etc.). Further, $n_1 \leq n_2 \leq n_3 \leq n_4$ may be indices of four stage transitions in the customer journey. Each $\bar{x}_i$ is a tuple of fixed size containing additional information such as a timestamp, channel, etc. The customer journey X is traversed from left to right, and identical touch-points (i.e., with a same time-stamp) can be compressed into a new touch-point. The new touch-point is same as the individual composition touch-points and can store multiple identical touch-points. For example, if $(x_1{}^1, \ldots, x_1{}^k)=\overline{x}_1=\overline{x}_2=\overline{x}_3\neq\overline{x}_4$, the tuples $\overline{x}_1$, $\overline{x}_2$, $\overline{x}_3$ can be compressed into a new touch-point, $\overline{z}_1=(3, x_1{}^1, \ldots, x_1{}^k)$. As a result, redundant information is removed, and a more compact input is created for the models. Ultimately, a sequence $(\overline{x}_1, \ldots, \overline{x}_n)$ can be obtained. Next, the new indices, $n_1, n_2, n_3, n_4$ can be computed without a loss of generality by keeping track of the stage transition touch-points. Additionally, $n_4$ is the last stage transition conversion (or a lack of conversion), and therefore $n=n_4$. In some cases, two features are created using the time gap $d_i$ (in seconds) between touch-points $i{-}1$ and $i$ for each $\overline{x}_i$. For $i{=}1$, the features are defined to be 0. The time gap $d_i$ can be divided into two parts, i.e., days($d_i$), seconds($d_i$), where days($d_i$) is number of days covered by $d_i$ and seconds($d_i$) is the number of seconds that remain after accounting for the days. Finally, the features added to $\overline{X}_i$ are $\log_2(\text{days}(d_i)+1)$ and $\log_2(\text{seconds}(d_i)+1)$. In some cases, a fourth discrete feature can be added that captures the channel used for interaction. For example, in a journey with 54 channels, the feature takes values $\{1, \ldots, 54\}$. An example embodiment of the disclosure includes a dataset with four features for a touch-point. Three features are numeric and can be used as float values by the model, and the fourth feature can be an index that can be embedded using an embedding layer. In some cases, the stage transition indices $n_1, n_2, n_3, n_4$ can used by the models. In some cases, the data is split into 80%-10%-10% for training, validation, and testing datasets.

Causal Multi-Touch Attribution

A method for causal multi-touch attribution is described. One or more aspects of the method include identifying an ordered series representing a plurality of precursor events corresponding to a result event, wherein each of the precursor events is associated with an event category from a set of event categories; generating a series of predictive values corresponding to the plurality of precursor events by computing a plurality of hidden vector representations for at least one of the precursor events using a temporal convolution network; and computing an attribution value for each of the event categories based on the series of predictive values.

Some examples of the method further include monitoring user interactions with a website, wherein at least a portion of the precursor events correspond to the user interactions with the website. Some examples further include recording a sale following the user interactions with the website, wherein the result event corresponds to the sale.

Some examples of the method further include identifying a plurality of users, wherein each of the users is associated with at least one of the precursor events. Some examples further include identifying a same organization for each of the plurality of users. Some examples further include including the precursor events in the ordered series based at least in part on the same organization.

Some examples of the method further include generating a feature vector for each of the plurality of precursor events, wherein the temporal convolution network takes the feature vector as input. In some aspects, each of the plurality of hidden vector representations at an intermediate layer of the temporal convolution network is computed based on previous precursor events. In some aspects, each of the plurality of hidden vector representations at the intermediate layer is computed independent of subsequent precursor events.

FIG. 10 shows an example of a process 1000 for causal multi-touch attribution according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system identifies an ordered series representing a set of precursor events corresponding to a result event, where each of the precursor events is associated with an event category from a set of event categories. In some cases, the operations of this step refer to, or may be performed by, a time series component as described with reference to FIGS. 6 and 9. In some embodiments, the identification of an ordered series may be performed as described with reference to FIGS. 3-6.

At operation 1010, the system generates a series of predictive values corresponding to the set of precursor events by computing a set of hidden vector representations for at least one of the precursor events using a temporal convolution network. In some cases, the operations of this step refer to, or may be performed by, a temporal convolution network as described with reference to FIGS. 6, 7, and 9. In some embodiments, the generation of a series of predictive values may be performed as described with reference to FIG. 7.

At operation 1015, the system computes an attribution value for each of the event categories based on the series of predictive values. In some cases, the operations of this step refer to, or may be performed by, an attribution component as described with reference to FIGS. 6 and 9. In some embodiments, the computation of attribution values may be performed as described with reference to FIG. 8.

Some examples of the method further include performing logistic regression on a subset of the precursor events based on the determination, wherein the attribution value for each of the event categories is based at least in part on the logistic regression. Some examples further include identifying an input size for the temporal convolution network. Some examples further include determining that a number of the precursor events in the ordered series exceeds the input size.

Figure 11:
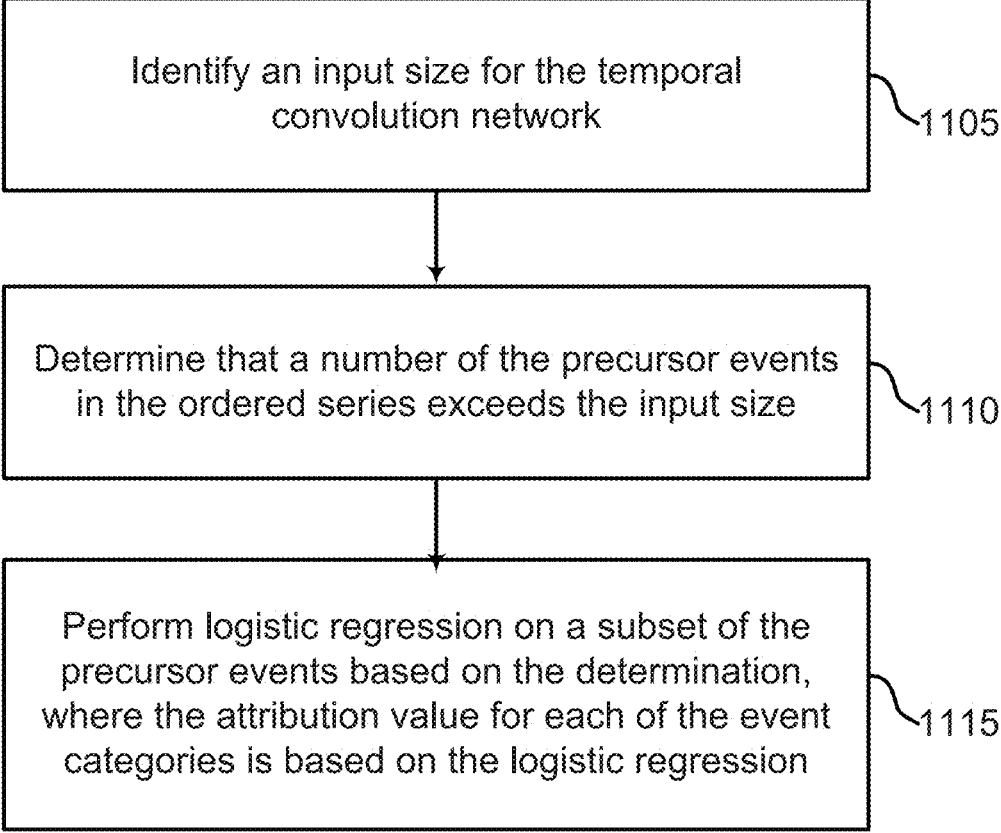
FIG. 11 shows an example of a process for performing logistic regression according to aspects of the present disclosure.

FIG. 11 shows an example of a method 1100 for performing logistic regression according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system identifies an input size for the temporal convolution network. In some cases, the operations of this step refer to, or may be performed by, a logistic regression component as described with reference to FIGS. 6 and 8.

At operation 1110, the system determines that a number of the precursor events in the ordered series exceeds the input size. In some cases, the operations of this step refer to, or may be performed by, a logistic regression component as described with reference to FIGS. 6 and 8.

At operation 1115, the system performs logistic regression on a subset of the precursor events based on the determination, where the attribution value for each of the event categories is based on the logistic regression. In some cases, the operations of this step refer to, or may be performed by, a logistic regression component as described with reference to FIGS. 6 and 8.

Some examples of the method further include identifying an additional ordered series representing a plurality of additional precursor events corresponding to the result event, wherein the ordered series corresponds to a first event stage and the additional ordered series corresponds to a second event stage. Some examples further include computing a plurality of additional hidden vector representations for each of the plurality of additional precursor events using an additional temporal convolution network, wherein the series of predictive values is based on the plurality of hidden vector representations and the plurality of additional hidden vector representations.

Some examples of the method further include combining output from the temporal convolution network and the additional temporal convolution network to produce a combined hidden representation. Some examples further include processing the combined hidden representation using a combined neural network layer, wherein the series of predictive values are based on the output of the combined neural network layer. In some aspects, the first stage and the second stage comprises different stages of a customer relationship management funnel.

Some examples of the method further include computing stage attribution values for each of the different stages of the customer relationship management funnel. In some aspects, the set of event categories comprises a set of customer relationship management channels.

FIG. 12 shows an example of a method 1200 for multistage temporal convolution according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system identifies an additional ordered series representing a set of additional precursor events corresponding to the result event, where the ordered series corresponds to a first event stage and the additional ordered series corresponds to a second event stage. In some cases, the operations of this step refer to, or may be performed by, a time series component as described with reference to FIGS. 6 and 9.

At operation 1210, the system computes a set of additional hidden vector representations for each of the set of additional precursor events using an additional temporal convolution network, where the series of predictive values is based on the set of hidden vector representations and the set of additional hidden vector representations. In some cases, the operations of this step refer to, or may be performed by, a temporal convolution network as described with reference to FIGS. 6, 7, and 9.

At operation 1215, the system combines output from the temporal convolution network and the additional temporal convolution network to produce a combined hidden representation. In some cases, the operations of this step refer to, or may be performed by, a multistage network as described with reference to FIGS. 6 and 8.

At operation 1220, the system processes the combined hidden representation using a combined neural network layer, where the series of predictive values are based on the output of the combined neural network layer. In some cases, the operations of this step refer to, or may be performed by, a multistage network as described with reference to FIGS. 6 and 8.

A method for training a temporal convolution network according to aspects and embodiments of the present disclosure is described. One or more aspects of the method include identifying training data including an ordered series representing a plurality of precursor events corresponding to a result event and ground truth conversion data, wherein each of the precursor events is associated with an event category from a set of event categories; generating a series of predictive values corresponding to the plurality of precursor events by computing a plurality of hidden vector representations for at least one of the precursor events using a temporal convolution network; computing a conversion prediction based on the series of predictive values; computing a loss function that compares the conversion prediction to the ground truth conversion data; and updating parameters of the temporal convolution network based on the loss function.

Some examples of the method further include computing a gradient of the loss function for each of the parameters, wherein the parameters are updated based on the gradient.

In some aspects, the loss function comprises a cross entropy loss function.

Figure 13:
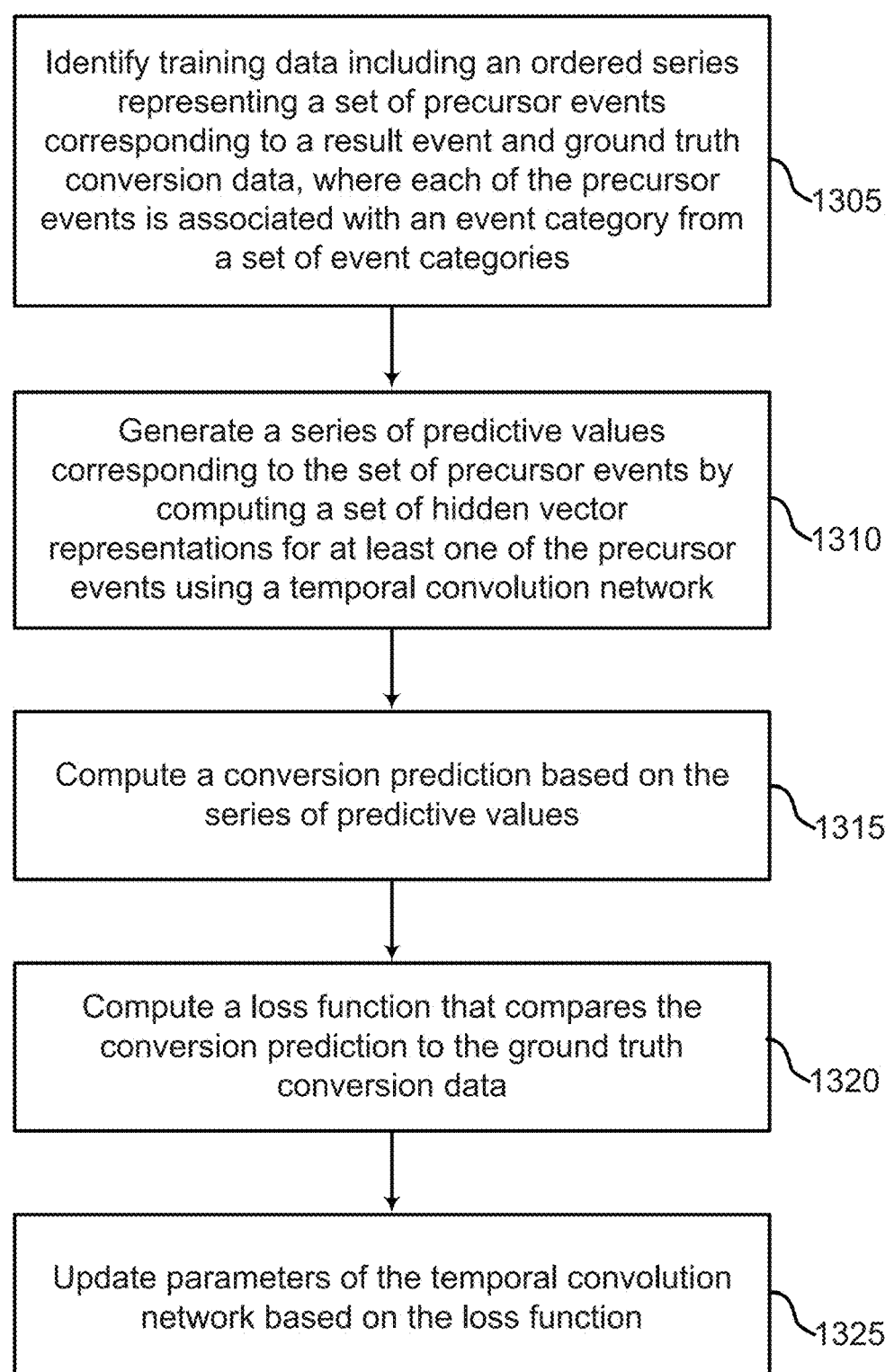
FIG. 13 shows an example of a process for training a temporal convolution network according to aspects of the present disclosure.

FIG. 13 shows an example of a method 1300 for training a temporal convolution network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations. In some cases, the operations of the method 1300 refer to, or may be performed by, a training component as described with reference to FIG. 6.

At operation 1305, the system identifies training data including an ordered series representing a set of precursor events corresponding to a result event and ground truth conversion data, where each of the precursor events is associated with an event category from a set of event categories.

At operation 1310, the system generates a series of predictive values corresponding to the set of precursor events by computing a set of hidden vector representations for at least one of the precursor events using a temporal convolution network.

At operation 1315, the system computes a conversion prediction based on the series of predictive values.

At operation 1320, the system computes a loss function that compares the conversion prediction to the ground truth conversion data. The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

At operation 1325, the system updates parameters of the temporal convolution network based on the loss function.

The description and drawings described herein represent example configurations and do not represent all the implementations within the scope of the claims. For example, the operations and steps may be rearranged, combined, or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
identifying training data including an ordered series representing a plurality of precursor events corresponding to a result event and ground truth conversion data, wherein each of the precursor events is associated with an event category from a set of event categories;
generating a first series of predictive values corresponding to the plurality of precursor events by computing a plurality of hidden vector representations for at least one of the precursor events using a temporal convolution network;
generating a second series of predictive values using a logistic regression component configured to perform logistic regression on a subset of the precursor events,
concatenating the first series of predictive values and the second series of predictive values to produce a combined series,
applying, to the combined series, a dense neural network layer followed by an activation function to produce a combined input,
computing a conversion prediction based on the combined output;
computing a loss function that compares the conversion prediction to the ground truth conversion data; and
updating parameters of the temporal convolution network based on the loss function.

2. The method of claim 1, further comprising:
computing a gradient of the loss function for each of the parameters, wherein the parameters are updated based on the gradient.

3. The method of claim 1, wherein:
the loss function comprises a cross entropy loss function.

4. An apparatus comprising:
a time series component configured to generate an ordered series representing a plurality of precursor events corresponding to a result event, wherein each of the precursor events is associated with an event category from a set of event categories;
a first temporal convolution network having a dilation factor which increases exponentially with respect to layer depth, which is configured to generate a first series of predictive values corresponding to the plurality of precursor events by computing a plurality of hidden vector representations for a first set of one or more of the precursor events;
a second temporal convolution network, which is configured to generate a second series of predictive values corresponding to the plurality of precursor events by computing a plurality of hidden vector representations for a second set of one or more of the precursor events which is different from the first set of one or more of the precursor events;

a combiner which concatenates the first series of predictive values and the second series of predictive values to produce a combined series, and an attribution component configured to compute an attribution value for each of the event categories based on the combined series.

5. The apparatus of claim 4, further comprising:

a logistic regression component configured to perform logistic regression on a subset of the precursor events.

6. The apparatus of claim 4, further comprising:

an event tracking component configured to record the plurality of precursor events.

7. The apparatus of claim 4, further comprising:

a training component configured to update parameters of the temporal convolution network based on the hidden vector representations.

\*　\*　\*　\*　\*